US012785890B2

(12) United States Patent
Go et al.

(10) Patent No.: US 12,785,890 B2
(45) Date of Patent: Nov. 3, 2026

(54) METHOD FOR TRANSMITTING/RECEIVING SOUNDING REFERENCE SIGNAL IN WIRELESS COMMUNICATION SYSTEM, AND DEVICE THEREFOR

(71) Applicant: LG ELECTRONICS INC., Seoul (KR)

(72) Inventors: Seongwon Go, Seoul (KR); Jiwon Kang, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 511 days.

(21) Appl. No.: 18/029,410

(22) PCT Filed: Oct. 6, 2021

(86) PCT No.: PCT/KR2021/013662

§ 371 (c)(1), (2) Date: Mar. 30, 2023

(87) PCT Pub. No.: WO2022/075726

PCT Pub. Date: Apr. 14, 2022

(65) Prior Publication Data

US 2023/0275730 A1 Aug. 31, 2023

(30) Foreign Application Priority Data

Oct. 7, 2020 (KR) ........................ 10-2020-0129532

(51) Int. Cl.
*H04L 27/26* (2006.01)
*H04L 5/00* (2006.01)

(52) U.S. Cl.
CPC ........ *H04L 5/0051* (2013.01); *H04L 27/2605* (2013.01)

(58) Field of Classification Search
CPC ............... H04L 5/0051; H04L 27/2605; H04L 25/0224; H04L 5/0048; H04L 5/0094;
(Continued)

(56) References Cited

U.S. PATENT DOCUMENTS 11,218,996 B2 * 1/2022 Wang .................... H04W 48/12
12,328,700 B2 * 6/2025 Dai ....................... H04W 56/00
(Continued)

FOREIGN PATENT DOCUMENTS

EP 3934121 A1 * 1/2022 ........... H04B 7/0602
EP 3998793 A1 * 5/2022 ........... H04B 7/0608
(Continued)

*Primary Examiner* — Jay P Patel
(74) *Attorney, Agent, or Firm* — BRYAN CAVE LEIGHTON PAISNER LLP

(57) ABSTRACT

A method of transmitting a sounding reference signal (SRS) by a user equipment (UE) in a wireless communication system comprises receiving configuration information related to a sounding reference signal (SRS), and transmitting the SRS based on the configuration information. The configuration information includes information related to an antenna switching, and the SRS is transmitted based on a plurality of SRS resource sets. Based on the plurality of SRS resource sets being configured in one or more slots, each of the plurality of SRS resource set is configured not to overlap with a guard period for the antenna switching in the one or more slots.

11 Claims, 12 Drawing Sheets

(58) Field of Classification Search
CPC ... H04L 27/261; H04L 5/0023; H04B 7/0602; H04W 72/0446
See application file for complete search history.

(56) References Cited

U.S. PATENT DOCUMENTS

| | | | | |
|---|---|---|---|---|
| 2020/0028638 | A1 | 1/2020 | Liu et al. | |
| 2020/0052853 | A1 | 2/2020 | Qin et al. | |
| 2021/0058910 | A1* | 2/2021 | Yokomakura | H04L 5/0048 |
| 2021/0083824 | A1* | 3/2021 | Wernersson | H04L 5/0051 |
| 2021/0258940 | A1* | 8/2021 | Kim | H04L 5/0094 |
| 2022/0029861 | A1* | 1/2022 | Shahmohammadian | H04L 5/0048 |
| 2022/0116979 | A1* | 4/2022 | Park | H04B 7/0628 |
| 2022/0166587 | A1* | 5/2022 | Go | H04L 1/1864 |
| 2022/0201696 | A1* | 6/2022 | Go | H04W 72/51 |
| 2022/0312440 | A1* | 9/2022 | Bagheri | H04W 72/044 |
| 2022/0322265 | A1* | 10/2022 | Dai | H04W 56/00 |
| 2022/0337373 | A1* | 10/2022 | Wu | H04L 5/0048 |
| 2022/0337456 | A1* | 10/2022 | Kwak | H04B 7/0626 |
| 2022/0345195 | A1* | 10/2022 | Jang | H04B 7/06952 |
| 2023/0047048 | A1* | 2/2023 | Liu | H04B 7/0417 |
| 2023/0209571 | A1* | 6/2023 | Liu | H04L 5/0078 370/329 |
| 2023/0224124 | A1* | 7/2023 | Nilsson | H04L 5/0094 370/330 |

FOREIGN PATENT DOCUMENTS

| | | | |
|---|---|---|---|
| WO | 2020/056180 | A1 | 3/2020 |
| WO | 2020/084362 | A1 | 4/2020 |
| WO | 2020/165413 | A1 | 8/2020 |

* cited by examiner

【FIG. 1】
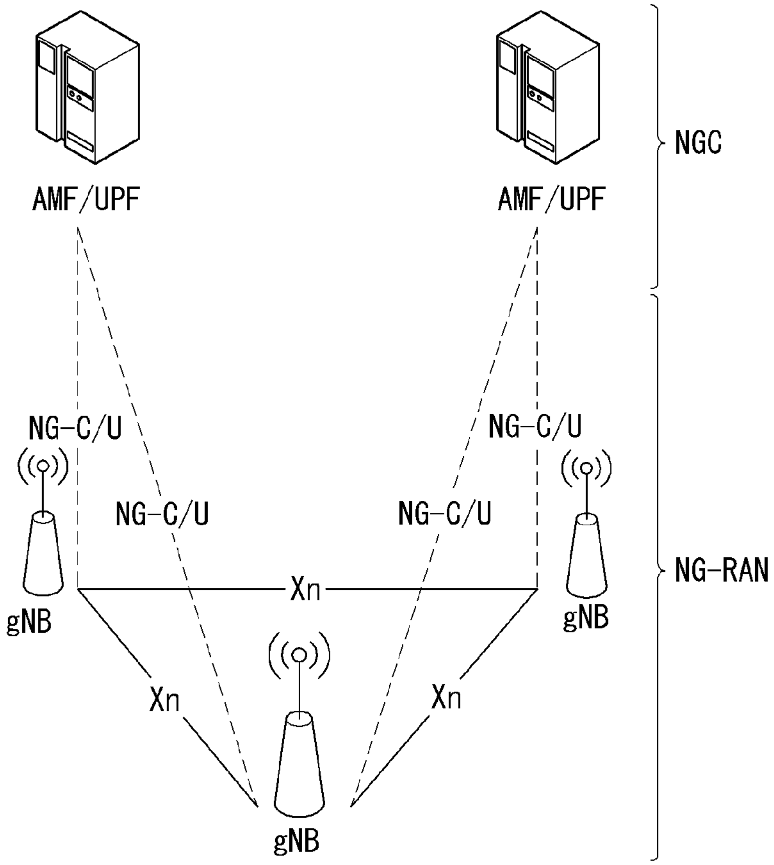
【FIG. 2】
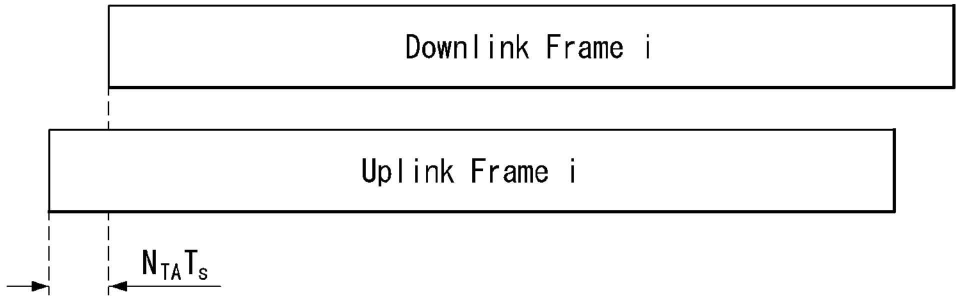

【FIG. 3】
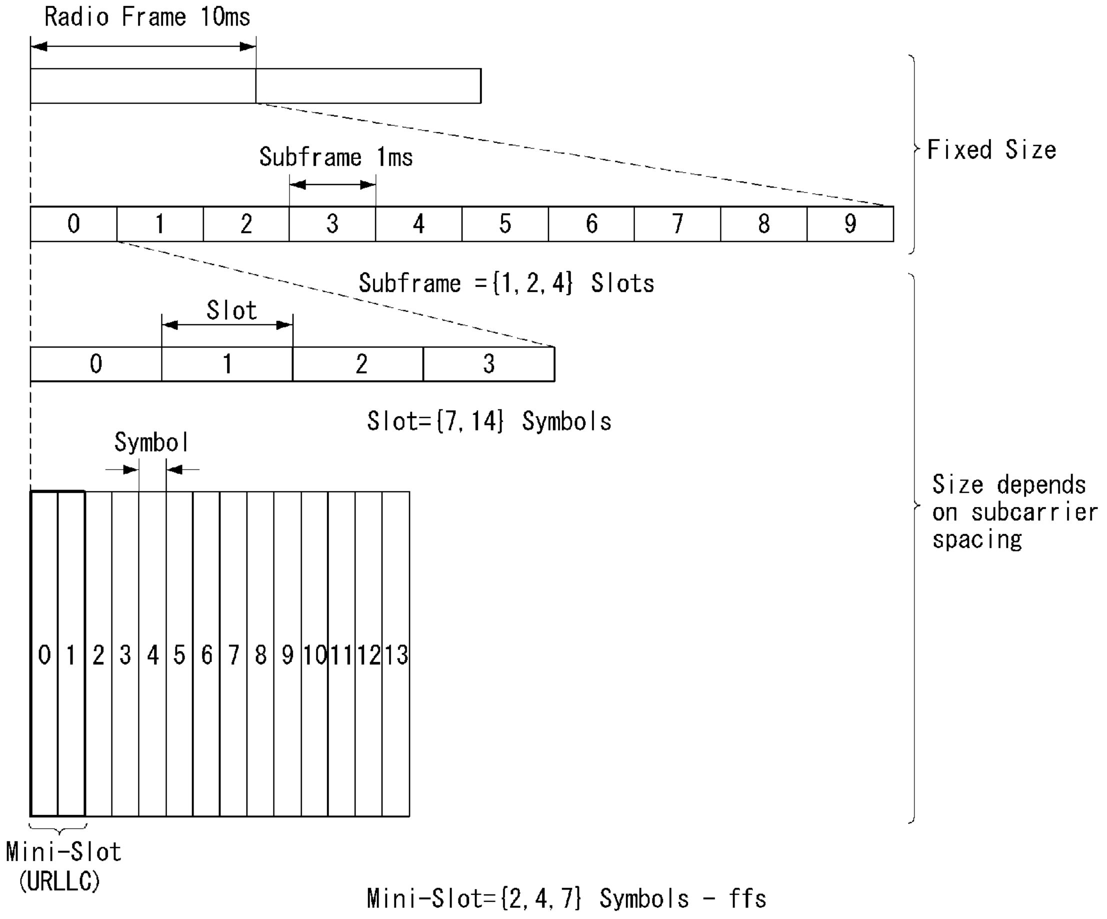

【FIG. 4】
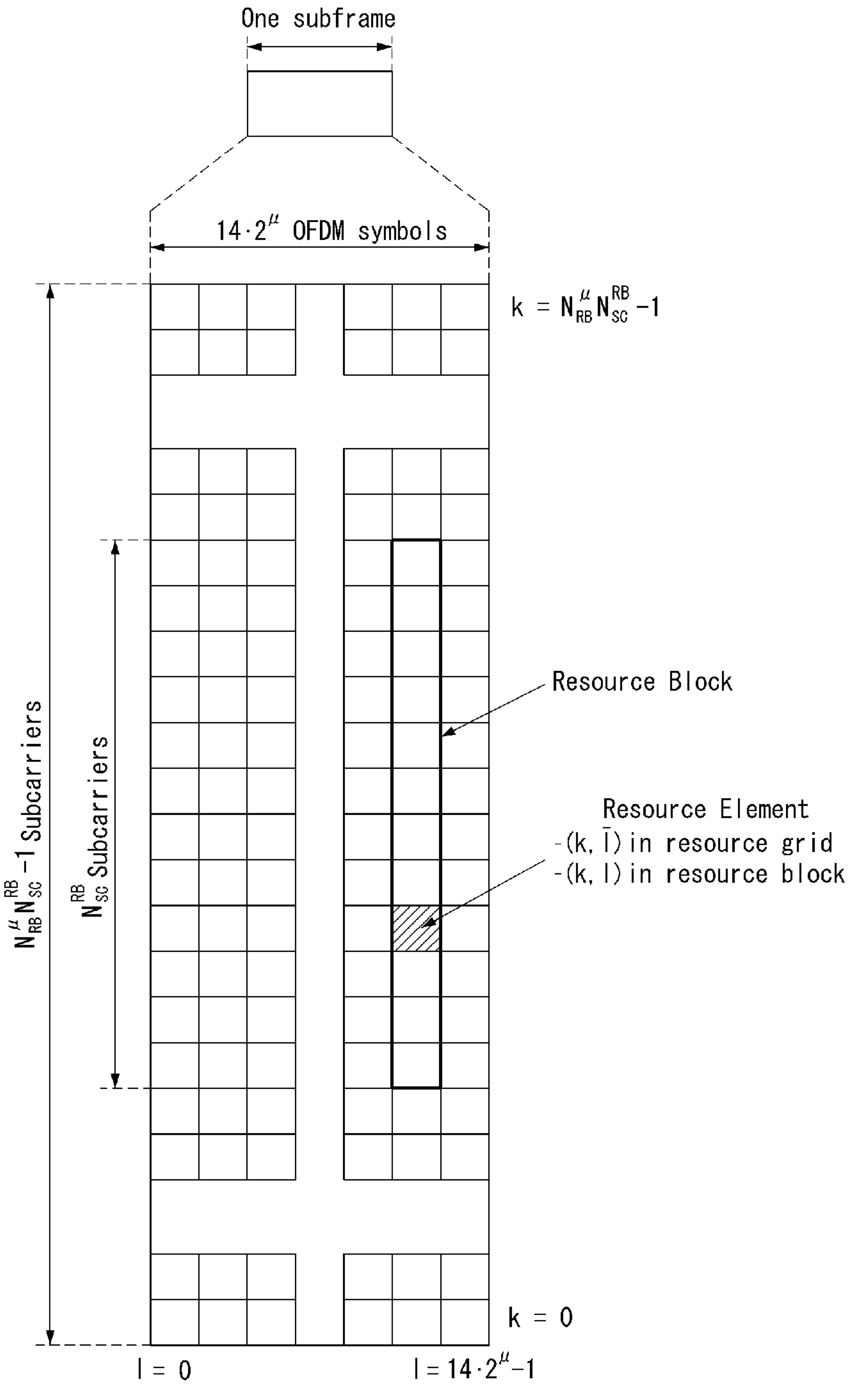

【FIG. 5】
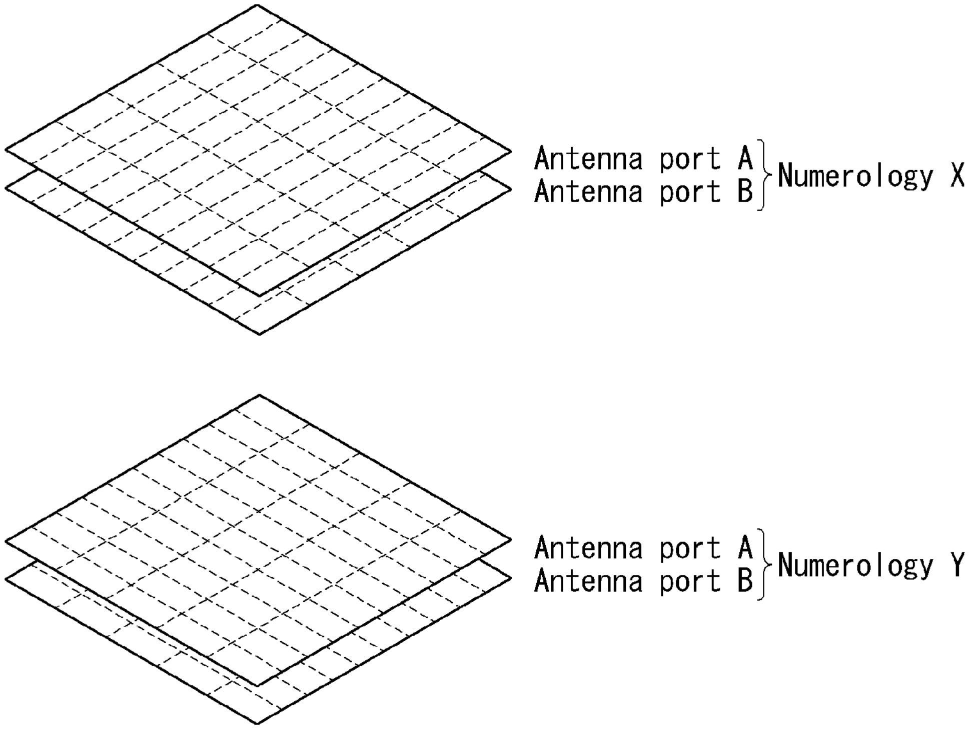
【FIG. 6】
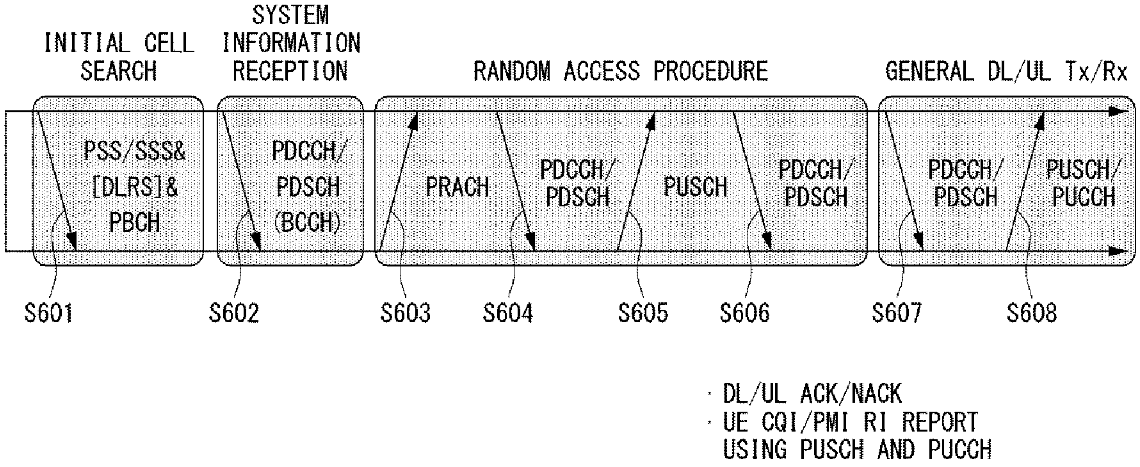

【FIG. 7】
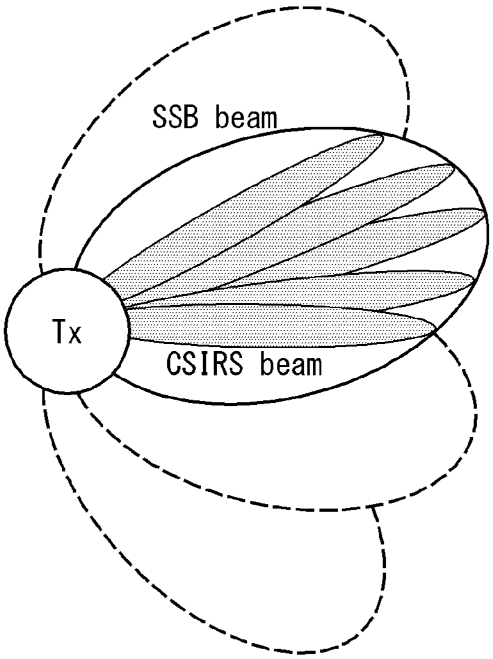
【FIG. 8】
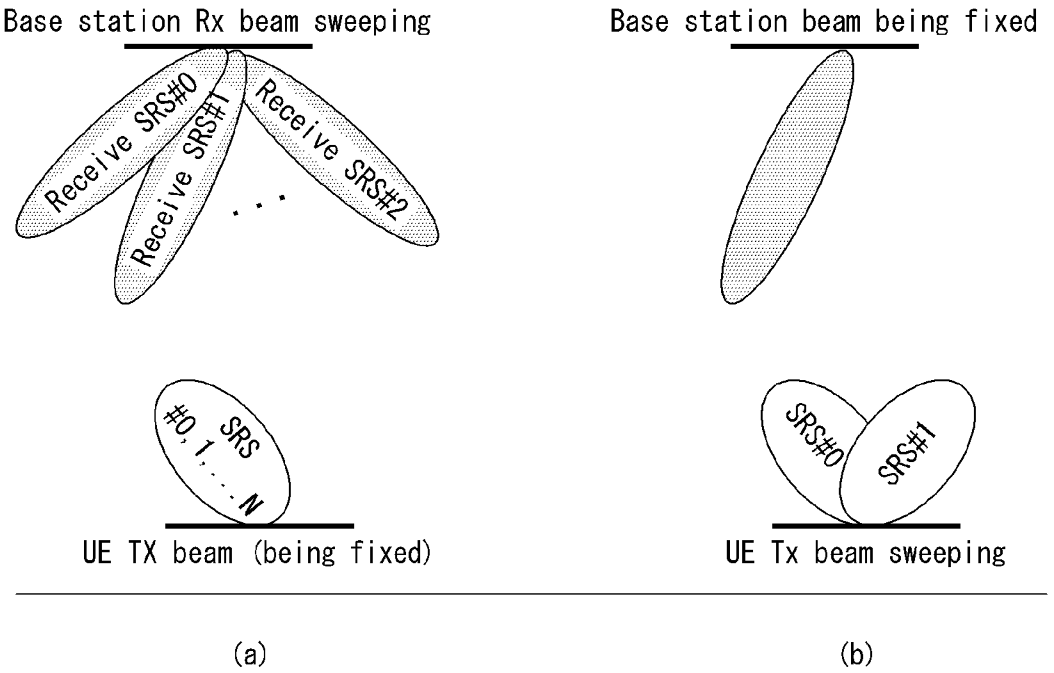

【FIG. 9】
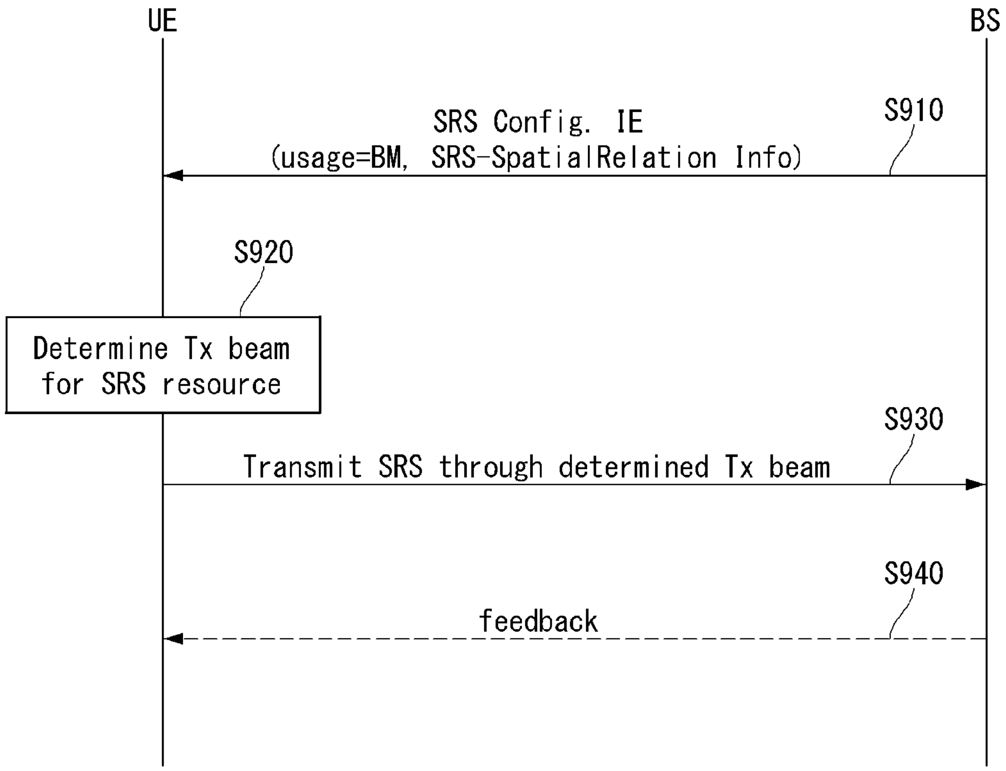

【FIG. 10】
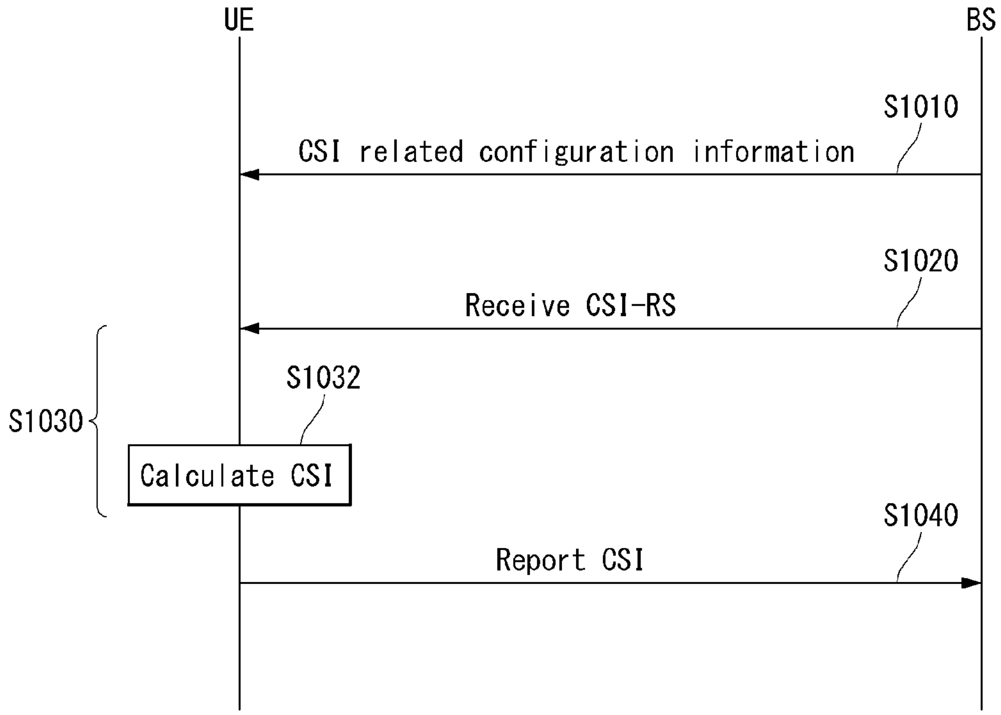

【FIG. 11】
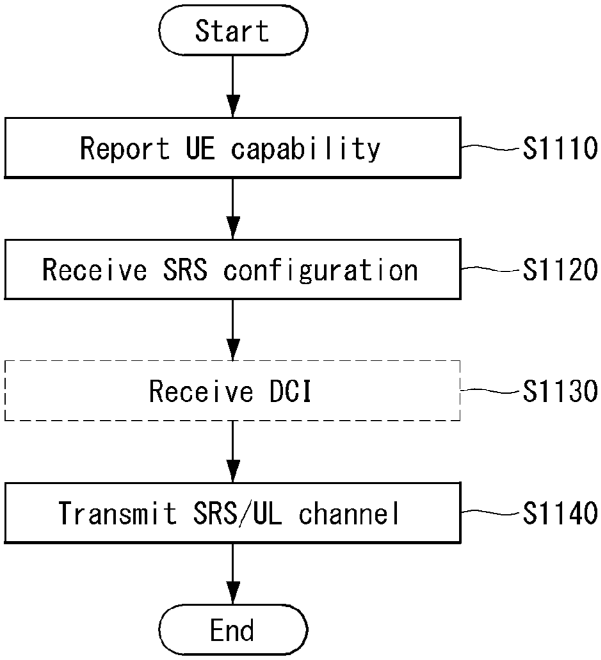
【FIG. 12】
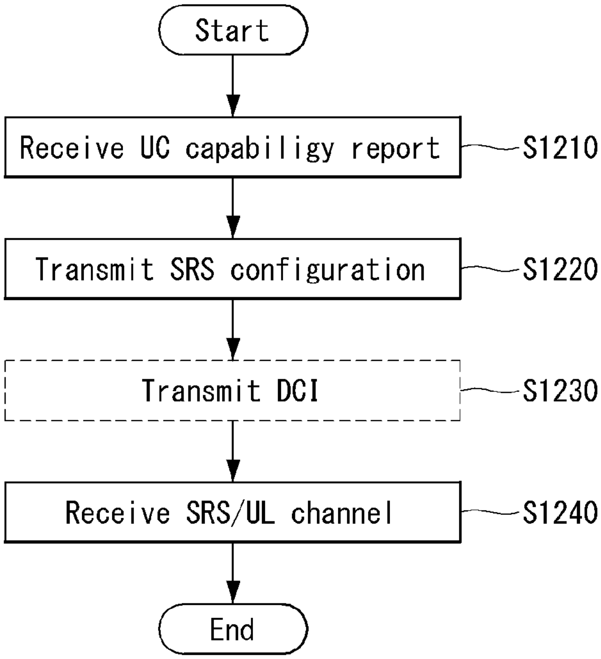

[FIG. 13]
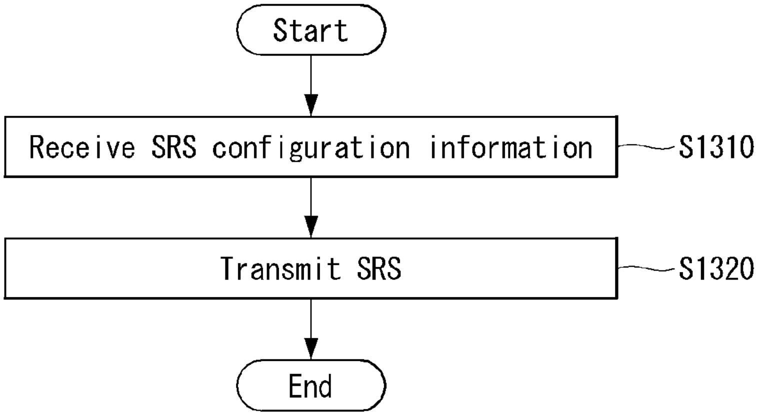
【FIG. 14】
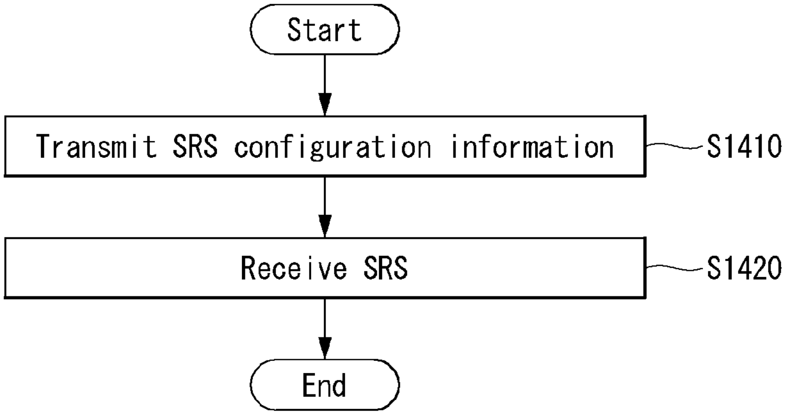

【FIG. 15】
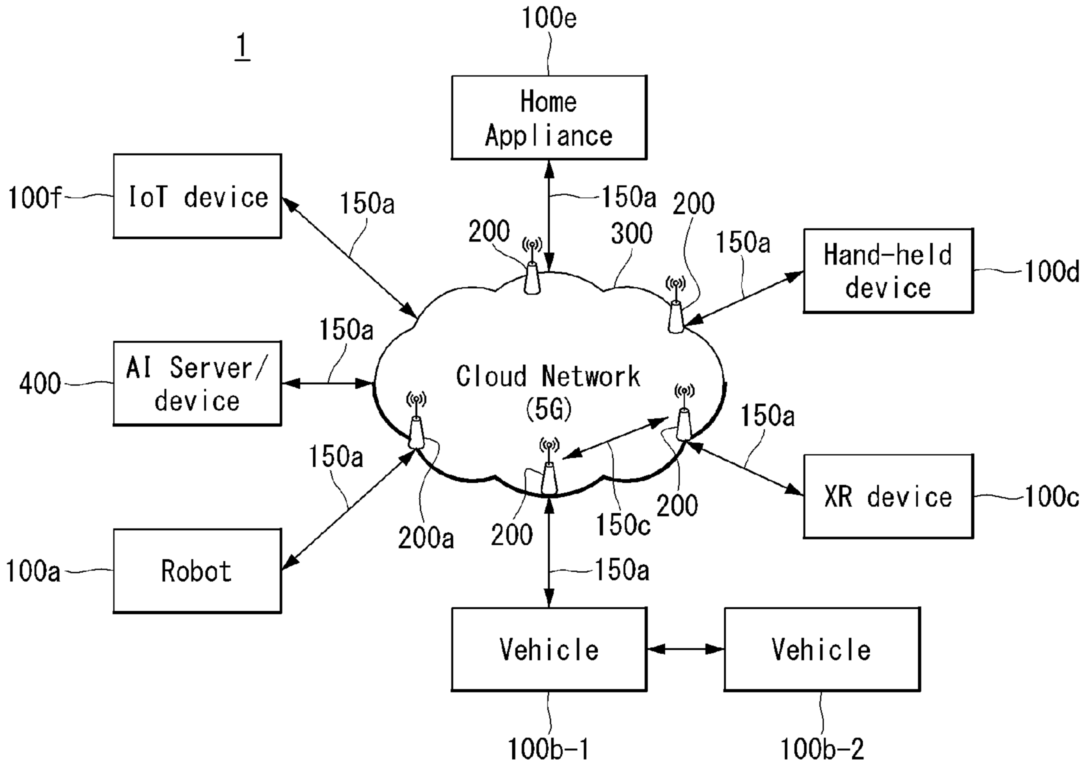
【FIG. 16】
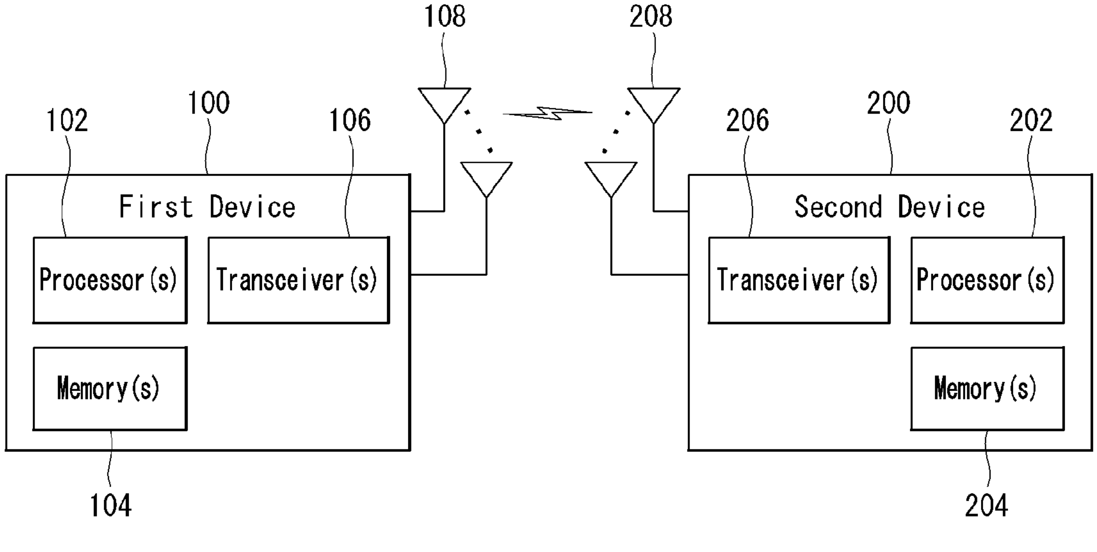

【FIG. 17】
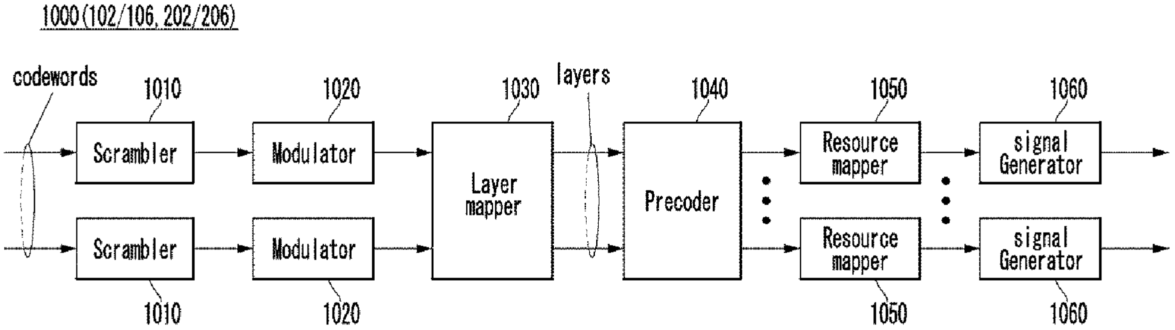
【FIG. 18】
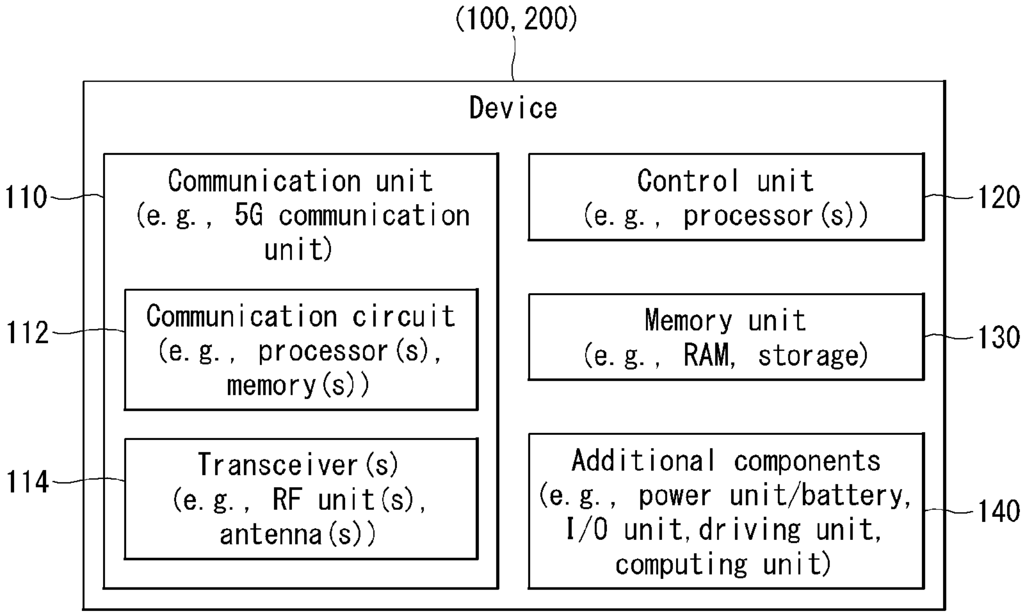

【FIG. 19】
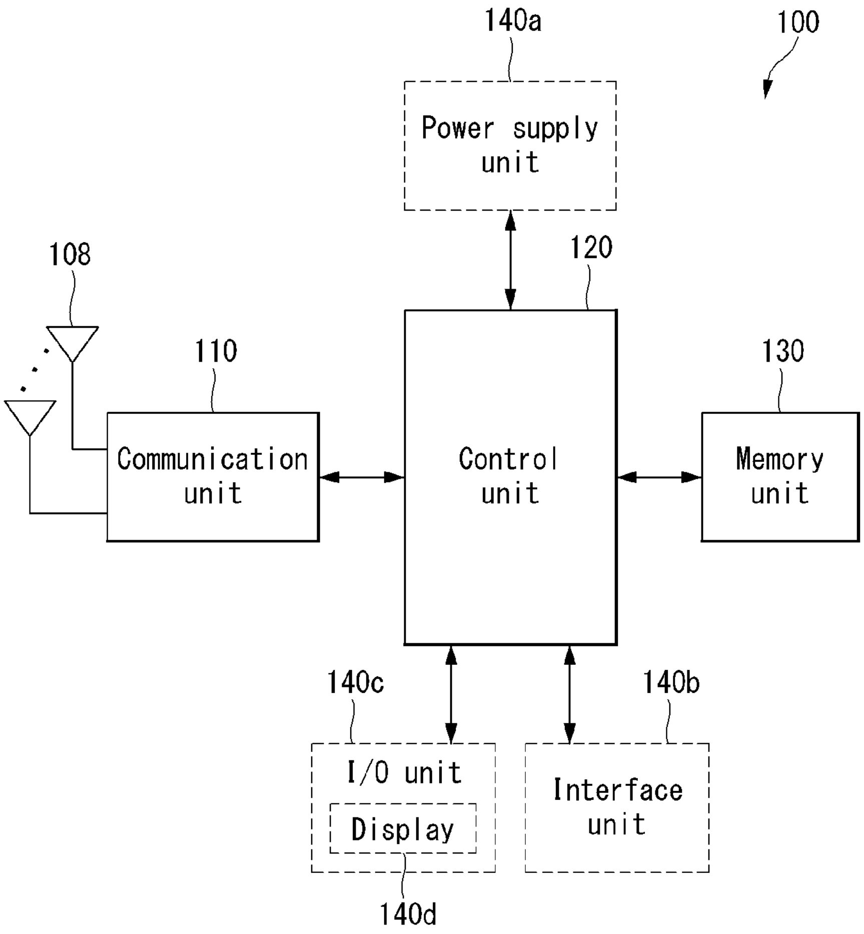

METHOD FOR TRANSMITTING/RECEIVING SOUNDING REFERENCE SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2021/013662, filed on Oct. 6, 2021, which claims the benefit of KR Application No. 10-2020-0129532, filed on Oct. 7, 2020, the contents of which are all hereby incorporated by reference herein in their entirety.

TECHNICAL FIELD

The present disclosure relates to a method of transmitting and receiving a sounding reference signal in a wireless communication system and a device therefor.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

The present disclosure provides a method for SRS antenna switching.

With regard to SRS antenna switching, the following can be considered. Based on FR4 (e.g., 52.6-71 GHz) which is scheduled to be supported in the future, a symbol duration is shortened, and the number of symbols for a guard period increases. Further, SRS antenna switching is supported for five or more (Rx) antennas, and thus the number of symbols required for SRS transmission increases.

Accordingly, the present disclosure proposes a method for supporting an SRS antenna switching operation based on a frequency band and the number of antennas which is scheduled to be supported in the future, as well as SRS antenna switching based on an existing frequency band and the number of antennas.

The technical objects of the present disclosure are not limited to the aforementioned technical objects, and other technical objects, which are not mentioned above, will be apparently appreciated by a person having ordinary skill in the art from the following description.

In one aspect of the present disclosure, there is provided a method of transmitting a sounding reference signal (SRS) by a user equipment (UE) in a wireless communication system, the method comprising receiving configuration information related to a sounding reference signal (SRS), and transmitting the SRS based on the configuration information.

The configuration information includes information related to an antenna switching, and the SRS is transmitted based on a plurality of SRS resource sets.

The plurality of SRS resource sets are related to a plurality of antenna ports.

Based on the plurality of SRS resource sets being configured in one or more slots, each of the plurality of SRS resource set is configured not to overlap with a guard period for the antenna switching in the one or more slots.

Each of the plurality of SRS resource sets may include at least one SRS resource.

The one or more slots may be based on a plurality of slots.

The plurality of slots may be based on consecutive uplink (UL) slots.

Based on a time domain behavior related to a transmission of the SRS being aperiodic, and all or some of the one or more slots being out of a preset range, a transmission of an SRS based on an SRS resource set that is triggered beyond the preset range among the plurality of SRS resource sets may be dropped.

The preset range may be determined based on at least one of consecutive UL slots or a preset number of UL slots.

Based on a time domain behavior related to a transmission of the SRS being periodic or semi-persistent, a periodicity related to the plurality of SRS resource sets may be based on two or more different periodicities.

A periodicity having a shortest length among the two or more different periodicities may be related to one or more specific antenna ports among the plurality of antenna ports.

Based on the antenna switching being performed based on a plurality of panels, the plurality of slots may be based on discontinuous uplink slots, and time intervals between the discontinuous uplink slots may include a time interval based on a panel switching delay.

The method may further comprise receiving downlink control information (DCI) triggering a transmission of the SRS.

In another aspect of the present disclosure, there is provided a user equipment (UE) transmitting a sounding reference signal (SRS) in a wireless communication system, the UE comprising one or more transceivers, one or more processors, and one or more memories operably connected to the one or more processors, the one or more memories storing instructions that are configured so that the one or more processors perform operations based on the one or more memories being executed by the one or more processors.

The operations comprise receiving configuration information related to a sounding reference signal (SRS), and transmitting the SRS based on the configuration information.

The configuration information includes information related to an antenna switching, and the SRS is transmitted based on a plurality of SRS resource sets.

The plurality of SRS resource sets are related to a plurality of antenna ports.

Based on the plurality of SRS resource sets being configured in one or more slots, each of the plurality of SRS resource set is configured not to overlap with a guard period for the antenna switching in the one or more slots.

In another aspect of the present disclosure, there is provided a device comprising one or more memories, and one or more processors operably connected to the one or more memories. The one or more memories include instructions that are configured so that the one or more processors perform operations based on the one or more memories being executed by the one or more processors.

The operations comprise receiving configuration information related to a sounding reference signal (SRS), and transmitting the SRS based on the configuration information.

The configuration information includes information related to an antenna switching, and the SRS is transmitted based on a plurality of SRS resource sets.

The plurality of SRS resource sets are related to a plurality of antenna ports,

Based on the plurality of SRS resource sets being configured in one or more slots, each of the plurality of SRS resource set is configured not to overlap with a guard period for the antenna switching in the one or more slots.

In another aspect of the present disclosure, there are provided one or more non-transitory computer readable mediums storing one or more instructions. The one or more instructions executable by one or more processors are configured so that a user equipment (UE) performs operations.

The operations comprise receiving configuration information related to a sounding reference signal (SRS), and transmitting the SRS based on the configuration information.

The configuration information includes information related to an antenna switching, and the SRS is transmitted based on a plurality of SRS resource sets.

The plurality of SRS resource sets are related to a plurality of antenna ports.

Based on the plurality of SRS resource sets being configured in one or more slots, each of the plurality of SRS resource set is configured not to overlap with a guard period for the antenna switching in the one or more slots.

In another aspect of the present disclosure, there is provided a method of receiving a sounding reference signal (SRS) by a base station in a wireless communication system, the method comprising transmitting configuration information related to a sounding reference signal (SRS), and receiving the SRS based on the configuration information.

The configuration information includes information related to an antenna switching, and the SRS is transmitted based on a plurality of SRS resource sets.

The plurality of SRS resource sets are related to a plurality of antenna ports.

Based on the plurality of SRS resource sets being configured in one or more slots, each of the plurality of SRS resource set is configured not to overlap with a guard period for the antenna switching in the one or more slots.

In another aspect of the present disclosure, there is provided a base station receiving a sounding reference signal (SRS) in a wireless communication system, the base station comprising one or more transceivers, one or more processors, and one or more memories operably connected to the one or more processors, the one or more memories storing instructions that are configured so that the one or more processors perform operations based on the one or more memories being executed by the one or more processors.

The operations comprise transmitting configuration information related to a sounding reference signal (SRS), and receiving the SRS based on the configuration information.

The configuration information includes information related to an antenna switching, and the SRS is transmitted based on a plurality of SRS resource sets.

The plurality of SRS resource sets are related to a plurality of antenna ports.

Based on the plurality of SRS resource sets being configured in one or more slots, each of the plurality of SRS resource set is configured not to overlap with a guard period for the antenna switching in the one or more slots.

According to embodiments of the present disclosure, resource configuration for SRS antenna switching is performed in a form in which a guard period is configured between SRS resource sets. Even if SRS antenna switching is performed for five or more (e.g., 1T8R) antennas in a high frequency band (e.g., FR4), a guard period for antenna switching can be secured within a range in which SRS resource sets are configured.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8(*a*) and FIG. 8(*b*) illustrate an example of a UL BM procedure using an SRS.

FIG. 9 is a flowchart showing an example of a UL BM procedure using the SRS.

FIG. 10 is a flowchart illustrating an example of a CSI related procedure.

FIG. 11 is a flowchart for describing an operation of a UE to which a method proposed in the present disclosure is applicable.

FIG. 12 is a flowchart for describing an operation of a BS to which a method proposed in the present disclosure is applicable.

FIG. 13 is a flowchart for describing a method of transmitting, by a UE, a sounding reference signal in a wireless communication system according to an embodiment of the present disclosure.

FIG. 14 is a flowchart for describing a method for receiving, by a BS, a sounding reference signal in a wireless communication system according to another embodiment of the present disclosure.

FIG. 15 illustrates a communication system 1 applied to the present disclosure.

FIG. 16 illustrates wireless devices applicable to the present disclosure.

FIG. 17 illustrates a signal process circuit for a transmission signal.

FIG. 18 illustrates another example of a wireless device applied to the present disclosure.

FIG. 19 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11

(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE

- 36.211: Physical channels and modulation
- 36.212: Multiplexing and channel coding
- 36.213: Physical layer procedures
- 36.300: Overall description
- 36.331: Radio Resource Control (RRC)

3GPP NR

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=\Delta f_{max}N_f/100) \cdot T_s=10$ ms. Here, the radio frame is constituted of 10 subframes each of which has a period of $T_{sf}=(\Delta f_{max}N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $$n_s^{\mu} \in \{0, \ldots , N_{subframe}^{slots,\mu} - 1\}$$

in the subframe and in ascending order of $$n_{s,f}^{\mu} \in \{0, \ldots , N_{frame}^{slots,\mu} - 1\}$$

in the radio frame. One slot includes consecutive OFDM symbols of $$N_{symb}^{\mu}, \text{ and } N_{symb}^{\mu}$$

is determined according to the used numerology and slot configuration. In the subframe, the start of slot $$n_s^{\mu}$$

is temporally aligned with the start of $$n_s^{\mu} N_{symb}^{\mu}.$$

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $$N_{RB}^{\mu} N_{sc}^{RB}$$

subcarriers on a frequency domain, each subframe consisting of 14·2μ OFDM symbols, but the present disclosure is not limited thereto.

In the NR system, a transmitted signal is described by one or more resource grids, consisting of $$N_{RB}^{\mu} N_{sc}^{RB}$$

subcarriers, and $$2^{\mu} N_{symb}^{(\mu)}$$

OFDM symbols, where $$N_{PB}^{\mu} \le N_{RB}^{max,\mu} \cdot N_{RB}^{max,\mu}$$

denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where $$k = 0, \ldots, N_{PB}^{\mu} N_{sc}^{RB} - 1$$

is an index on a frequency domain, and $$\bar{l}=0, \ldots, 2^{\mu} N_{symb}^{(\mu)}-1$$

refers to a location of a symbol in a subframe. The index pair $(k,\bar{l})$ is used to refer to a resource element in a slot, where $$l=0, \ldots, N_{symb}^{\mu}-1.$$

The resource element $(k,\bar{l})$ for the numerology μ and the antenna port p corresponds to a complex value $$a_{k,\bar{l}}^{(p,\mu)}.$$

When there is no risk for confusion or when a specific antenna port or numerology is not specified, the indexes p and μ may be dropped, and as a result, the complex value may be $$a_{k,\bar{l}}^{(p)} \text{ or } a_{k,\bar{l}}.$$

Further, a physical resource block is defined as $$N_{sc}^{RB}=12$$

consecutive subcarriers in the frequency domain.

Point A serves as a common reference point of a resource block grid and may be obtained as follows.

- offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
- absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $$n_{CRB}^{\mu}$$

in the frequency domain and resource elements (k, l) for the subcarrier spacing configuration μ may be given by the following Equation 1.

$$n_{CRB}^{\mu}=\left\lfloor\frac{k}{N_{sc}^{RB}}\right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size}-1,$$

where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start}$$

Here, $$N_{BWP,i}^{start}$$

may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI)

through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

- Beam measurement: Operation of measuring characteristics of a beam forming signal received by the eNB or UE.
- Beam determination: Operation of selecting a transmit (Tx) beam/receive (Rx) beam of the eNB or UE by the eNB or UE.
- Beam sweeping: Operation of covering a spatial region using the transmit and/or receive beam for a time interval by a predetermined scheme.
- Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=            SEQUENCE {
  tci-StateId              TCI-StateId,
  qcl-Type1              QCL-Info,
  qcl-Type2              QCL-Info
  ...
}
QCL-Info ::=           SEQUENCE {
  cell                     ServCellIndex
  bwp-Id                   BWP-Id
  referenceSignal          CHOICE {
    csi-rs                 NZP-CSI-RS-ResourceId,
    ssb                      SSB-Index
  },
  qcl-Type               ENUMERATED {typeA, typeB, typeC, typeD},
  ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of an SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using an SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using an SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
-- TAG-MAC-CELL-GROUP-CONFIG-START
SRS-Config ::=                              SEQUENCE {
   srs-ResourceSetToReleaseList                 SEQUENCE (SIZE(1..maxNrofSRS-
ResourceSets)) OF SRS-ResourceSetId             OPTIONAL,          -- Need N
   srs-ResourceSetToAddModList                SEQUENCE (SIZE(1..maxNrofSRS-
ResourceSets)) OF SRS-ResourceSet                 OPTIONAL,          -- Need N
   srs-ResourceToReleaseList                    SEQUENCE (SIZE(1..maxNrofSRS-
Resources)) OF SRS-ResourceId                     OPTIONAL,        -- Need N
   srs-ResourceToAddModList                   SEQUENCE (SIZE(1..maxNrofSRS-
Resources)) OF SRS-Resource                     OPTIONAL,          -- Need N
   tpc-Accumulation                           ENUMERATED {disabled}
   ...
}
SRS-ResourceSet ::=                         SEQUENCE {
   srs-ResourceSetId                          SRS-ResourceSetId,
   srs-ResourceIdList                         SEQUENCE (SIZE(1..maxNrofSRS-
ResourcesPerSet)) OF SRS-ResourceId           OPTIONAL, -- Cond Setup
   resourceType                             CHOICE {
      aperiodic                               SEQUENCE {
         aperiodicSRS-ResourceTrigger               INTEGER (1..maxNrofSRS-
TriggerStates-1),
         csi-RS                                   NZP-CSI-RS-ResourceId
         slotoffset                                 INTEGER (1..32)
         ...
      },
      semi-persistent                           SEQUENCE {
         associatedCSI-RS                           NZP-CSI-RS-ResourceId
         ...
      },
      periodic                                SEQUENCE {
```

TABLE 6-continued

```
        associatedCSI-RS                          NZP-CSI-RS-ResourceId
        ...
      }
   },
   usage                               ENUMERATED {beamManagement,
codebook, nonCodebook, antennaSwitching},
   alpha                               Alpha
   p0                                  INTEGER (-202..24)
   pathlossReferenceRS                 CHOICE {
      ssb-Index                        SSB-Index,
      csi-RS-Index                     NZP-CSI-RS-ResourceId
SRS-SpatialRelationInfo ::=          SEQUENCE {
   servingCellId                       ServCellIndex
   referenceSignal                   CHOICE {
      ssb-Index                        SSB-Index,
      csi-RS-Index                     NZP-CSI-RS-ResourceId,
      srs                                SEQUENCE {
         resourceId                            SRS-ResourceId,
         uplinkBWP                           BWP-Id
      }
   }
}
SRS-ResourceId ::=                     INTEGER (0..maxNrofSRS-Resources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Hereinafter, a CSI related procedure will be described.

FIG. 10 is a flowchart illustrating an example of a CSI related procedure.

Referring to FIG. 10, in order to perform one of usages of the CSI-RS, a terminal (e.g., user equipment (UE)) receives, from a base station (e.g., general Node B or gNB), configuration information related to the CSI through radio resource control (RRC) signaling (S1010).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 7 shows an example of NZP CSI-RS resource set IE. Referring to Table 7, parameters (e.g., a BM related 'repetition' parameter and a tracking related 'trs-Info' parameter) representing the usage may be configured for each NZP CSI-RS resource set.

TABLE 7

```
-- ASN1START
-- TAG-NZP-CSI-RS-RESOURCESET-START
NZP-CSI-RS-ResourceSet ::=        SEQUENCE {
    nzp-CSI-ResourceSetId             NZP-CSI-RS-ResourceSetId,
    nzp-CSI-RS-Resources              SEQUENCE (SIZE (1..maxNrofNZP-CSI-RS-
ResourcesPerSet)) OF NZP-CSI-RS-ResourceId,
    repetition                        ENUMERATED { on, off }
    aperiodicTriggeringOffset         INTEGER (0..4)
    trs-Info                          ENUMERATED {true}
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 8 below shows an example of CSI-ReportConfig IE.

TABLE 8

```
-- ASN1START
-- TAG-CSI-RESOURCECONFIG-START
CSI-ReportConfig ::=                    SEQUENCE {
    reportConfigId                        CSI-ReportConfigId,
    carrier                               ServCellIndex          OPTIONAL, -
- Need S
    resourcesForChannelMeasurement         CSI-ResourceConfigId,
    csi-IM-ResourcesForInterference        CSI-ResourceConfigId  OPTIONAL, -
- Need R
    nzp-CSI-RS-ResourcesForInterference    CSI-ResourceConfigId  OPTIONAL, -
- Need R
    reportConfigType                      CHOICE {
        periodic                              SEQUENCE {
            reportSlotConfig                      CSI-
ReportPeriodicityAndOffset,
            pucch-CSI-ResourceList                    SEQUENCE (SIZE
(1..maxNrofBWPs)) OF PUCCH-CSI-Resource
        },
        semiPersistentOnPUCCH                 SEQUENCE {
            reportSlotConfig                      CSI-
ReportPeriodicityAndOffset,
            pucch-CSI-ResourceList                    SEQUENCE (SIZE
(1..maxNrofBWPs)) OF PUCCH-CSI-Resource
        },
        semiPersistentOnPUSCH                 SEQUENCE {
            reportSlotConfig                      ENUMERATED {sl5, sl10, sl20,
sl40, sl80, sl160, sl320},
            reportSlotOffsetList              SEQUENCE (SIZE (1..maxNrofUL-
Allocations)) OF INTEGER (0..32),
            p0alpha                               P0-PUSCH-AlphaSetId
        },
        aperiodic                             SEQUENCE {
            reportSlotOffsetList              SEQUENCE (SIZE (1..maxNrofUL-
Allocations)) OF INTEGER (0..32)
        }
    },
```

TABLE 8-continued

```
        reportQuantity                     CHOICE {
          none                                NULL,
          cri-RI-PMI-CQI                      NULL,
          cri-RI-i1                           NULL,
          cri-RI-i1-CQI                       SEQUENCE {
            pdsch-BundleSizeForCSI                ENUMERATED {n2, n4}
  OPTIONAL
          },
          cri-RI-CQI                          NULL,
          cri-RSRP                            NULL,
          ssb-Index-RSRP                      NULL,
          cri-RI-LI-PMI-CQI                   NULL
        },
```

The UE measures CSI based on configuration information related to the CSI (S1020). The CSI measurement may include (1) a CSI-RS reception process of the UE (S1021) and (2) a process of computing the CSI through the received CSI-RS (S1022), and a detailed description thereof will be made below.

For the CSI-RS, resource element (RE) mapping is configured time and frequency domains by higher layer parameter CSI-RS-ResourceMapping.

Table 9 shows an example of CSI-RS-ResourceMapping IE.

TABLE 9

```
    -- ASN1START
  -- TAG-CSI-RS-RESOURCEMAPPING-START
  CSI-RS-ResourceMapping ::=          SEQUENCE {
    frequencyDomainAllocation           CHOICE {
      row1                                BIT STRING (SIZE (4)),
      row2                                BIT STRING (SIZE (12)),
      row4                                BIT STRING (SIZE (3)),
      other                               BIT STRING (SIZE (6))
    },
    nrofPorts                           ENUMERATED {p1,p2,p4,p8,p12,p16,p24,p32},
    firstOFDMSymbolInTimeDomain         INTEGER (0..13),
    firstOFDMSymbolInTimeDomain2        INTEGER (2..12)
    cdm-Type                            ENUMERATED {noCDM, fd-CDM2, cdm4-FD2-TD2, cdm8-
FD2-TD4},
    density                             CHOICE {
      dot5                                ENUMERATED {evenPRBs, oddPRBs},
      one                                 NULL,
      three                               NULL,
      spare                               NULL
    },
    freqBand                            CSI-FrequencyOccupation,
    ...
  }
```

In Table 9, a density (D) represents a density of the CSI-RS resource measured in RE/port/physical resource block (PRB) and nrofPorts represents the number of antenna ports.

The UE reports the measured CSI to the BS (S1030).

Here, when a quantity of CSI-ReportConfig of Table 10 is configured to 'none (or No report)', the UE may skip the report.

However, even when the quantity is configured to 'none (or No report)', the UE may report the measured CSI to the BS.

The case where the quantity is configured to 'none (or No report)' is a case of triggering aperiodic TRS or a case where repetition is configured.

Here, only in a case where the repetition is configured to 'ON', the report of the UE may be omitted.

Hereinafter, an SRS for antenna switching will be described in detail.

SRS for 'antennaSwitching'

The SRS may be used for acquisition of DL channel state information (CSI) (i.e., DL CSI acquisition). As a specific example, in a single cell or multi-cell (e.g., CA) situation based on TDD, a base station (BS) may schedule transmission of the SRS to a user equipment (UE), and then measure the SRS from the UE. In this case, the BS may perform scheduling of a DL signal/channel to the UE based on measurement by the SRS by assuming DL/UL reciprocity. In this case, in relation to DL CSI acquisition based on the SRS, the SRS may be configured for an antenna switching usage.

As an example, according to a specification (e.g., 3gpp TS38.214), the usage of the SRS may be configured to the BS and/or the UE by using a higher layer parameter (e.g., a usage of RRC parameter SRS-ResourceSet). In this case, the usage of the SRS may be configured as a beam management usage, a codebook transmission usage, a non-codebook transmission usage, an antenna switching usage, etc.

Hereinafter, a case where the SRS transmission (i.e., transmission of an SRS resource or an SRS resource set) is configured for the antenna switching usage among the usages will be described in detail.

As an example, SRS transmission based on antenna switching (i.e., transmission antenna switching) may be supported for downlink (DL) channel state information (CSI) acquisition through the SRS transmission in a situation such as time division duplex (TDD). When the antenna switching is applied, approximately 15 μs may be required between SRS resources (and/or the SRS resource and the resource between PUSCH/PUCCH) in a general case for the antenna switching of the UE. By considering such a point, a (minimum) guard period shown in Table 10 below may be defined.

TABLE 10

| μ | Δf = $2^{\mu} \cdot 15$[kHz] | Y [symbol] |
|---|---|---|
| 0 | 15 | 1 |
| 1 | 30 | 1 |
| 2 | 60 | 1 |
| 3 | 120 | 2 |

In Table 10, μ represents numerology, represents a subcarrier spacing, and Y represents the number of symbols of the guard period, i.e., a length of the guard period. Referring to Table 10, the guard period may be configured based on a parameter μ for determining the numerology. In the guard period, the UE may be configured not to transmit any other signal, and the guard period may be configured to be intactly used for the antenna switching. As an example, the guard period may be configured by considering SRS resources transmitted in the same slot. In particular, when the UE is configured and/or instructed to transmit an aperiodic SRS configured to intra-slot antenna switching, the corresponding UE may transmit the SRS by using different transmission antennas for each designated SRS resource, and the guard period may be configured between respective resources.

Further, when the UE is configured with the SRS resource and/or the SRS resource set configured for the antenna switching usage through the higher layer signaling, the corresponding UE may be configured to perform the SRS transmission based on the UE capability related to the antenna switching. Here, the capability of the UE related to the antenna switching may be '1T2R', '2T4R', '1T4R', '1T4R/2T4R', '1T1R', '2T2R', '4T4R', etc. Here, 'mTnR' may mean a UE capability supporting m transmissions and n receptions.

(Sample S1) For example, in the case of a UE that supports 1T2R, up to two SRS resource sets may be configured as different values for resourceType of a higher layer parameter SRS-ResourceSet. Here, each SRS resource set may have two SRS resources transmitted in different symbols, and each SRS resource may constitute a single SRS port in a given SRS resource set. Further, an SRS port for a second SRS resource in the SRS resource set may be configured to be associated with a different UE antenna port from an SRS port for a first SRS resource in the same SRS resource set.

(Sample S2) As another example, in the case of a UE that supports 2T4R, up to two SRS resource sets may be configured as different values for resourceType of the higher layer parameter SRS-ResourceSet. Here, each SRS resource set may have two SRS resources transmitted in different symbols, and each SRS resource may constitute a single SRS port in a given SRS resource set. Further, an SRS port pair for the second SRS resource in the SRS resource set may be configured to be associated with a different UE antenna port from the SRS port pair for the first SRS resource in the same SRS resource set.

(Sample S3) As yet another example, in the case of a UE that supports 1T4R, the SRS resource sets may be configured in different schemes according to whether the SRS transmission is configured to be periodic, semi-persistent, and/or aperiodic. First, when the SRS transmission is configured to be periodic or semi-persistent, one SRS resource set constituted by 0 SRS resource set or four SRS resources configured based on for the resourceType of the higher layer parameter SRS-ResourceSet may be configured to be transmitted in different symbols. In this case, each SRS resource may constitute the single SRS port in the given SRS resource set, and the SRS port for each SRS resource may be configured to be associated with different UE antenna ports. Unlike this, when the SRS transmission is configured to be aperiodic, two SRS resource sets constituted by 0 SRS resource set or a total of four SRS resources configured based on for the resourceType of the higher layer parameter SRS-ResourceSet may be configured to be transmitted in different symbols of two different slots. In this case, the SRS ports for respective SRS resources in two given SRS resource sets may be configured to be associated with different UE antenna ports.

(Sample S4) As still yet another example, in the case of the UE that supports 1T1R, 2T2R, or 4T4R, up to two SRS resource sets of which each is constituted by one SRS resource may be configured for the SRS transmission, and the number of SRS ports of each SRS resource may be configured to 1, 2, or 4.

When an indicated UE capability is 1T4R/2T4R, the corresponding UE may expect that SRS ports (e.g., 1 or 2) of the same number will be configured for all SRS resources in the SRS resource set(s). Further, when the indicated UE capability is 1T2R, 2T4R, 1T4R, or 1T4R/2T4R, the corresponding UE may not expect that one or more SRS resource sets configured for the antenna switching usage in the same slot will be configured or triggered. Further, even when the indicated UE capability is 1T1R, 2T2R, or 4T4R, the corresponding UE may not expect that one or more SRS resource sets configured for the antenna switching usage in the same slot will be configured or triggered.

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

Hereinafter, matters related to the SRS transmission of the multi-panel UE will be described in detail.

It is assumed that SRS transmission for antenna switching for efficiently acquiring the downlink channel state information (DL CSI) is supported for a UE in which the number of transmission antennas (Tx antennas) is smaller than the number of reception antennas (Rx antennas) in Rel-15 NR MIMO. The UE that supports the antenna switching may report, to the BS, one of {"1T2R", "1T4R", "2T4R", "1T4R/2T4R", "T=R"} as the UE capability information, and the BS may configure the SRS resource set and the SRS resource for the antenna switching corresponding to the corresponding UE capability, and indicate the transmission. Further, the BS should configure a symbol gap according to numerology to be set between resources (as the guard period) at the time of configuring a time domain position of the resource in the SRS resource set for the antenna switching usage by considering an antenna switching time required for the antenna switching of the UE. More specific contents are described in Table 10 above and a description thereof.

Enhancement for panel-specific UL transmission is performed in Rel-16 NR eMIMO, and when a concept of 'panel' is introduced even in an antenna switching procedure, issues which should be additionally considered may occur, which include multi-panel simultaneous transmission, a beam indication for each panel, a panel switching time, etc. In the present disclosure, an antenna switching operation of the multi-panel UE will be clearly defined by considering the above-described issues, and an antenna switching configuring/indicating method of the BS for the corresponding operation, and a subsequent UE operation will be described.

Hereinafter, agreements related to multi-beam enhancement which may be applied to the method proposed in the present disclosure will be described.

1. Agreement (Panel-Specific UL Transmission)

In Rel-16, an identifier (ID) is supported, which may be used for representing the panel-specific UL transmission. The corresponding identifier may be utilizing or modifying an existing definition. Alternatively, the corresponding identifier may be newly defined.

2. Agreement (Number of Spatial Relations for PUCCH)

For UL beam management latency reduction in controlling PUCCH spatial relation, the maximum RRC configurable number of spatial relations for PUCCH (i.e., maxNrofSpatialRelationInfos) is increased to be 64 per BWP.

3. Agreement (ID for Panel-Specific UL Transmission)

The identifier (ID) which may be used for representing the panel-specific UL transmission may be one of the following Alt.1 to Alt.4.

- Alt.1: SRS resource set ID
- Alt.2: ID, which is directly associated to a reference RS resource and/or resource set
- Alt.3: ID, which is directly associated to a reference RS resource and/or resource set
- Alt.4: ID which is additionally configured in spatial relation info The multi-panel UE (MPUE) may be classified as follows.

MPUE-Assumption1: Multiple panels are implemented on a UE and only one panel can be activated at a time, with panel switching/activation delay of [X] ms.

MPUE-Assumption2: Multiple panels are implemented on a UE and multiple panels can be activated at a time and one or more panels can be used for transmission.

MPUE-Assumption3: Multiple panels are implemented on a UE and multiple panels can be activated at a time but only one panel can be used for transmission.

The multi-panel UE may be based on any one of MPUE assumption-1 to MPUE assumption-3. However, according to an implementation scheme of the multi-panel UE, the multi-panel UE may be based on at least one of assumption-1 to assumption-3 described above. Further, the classification of the multi-panel UE is just an example, and the multi-panel UE may be classified differently from the listed scheme.

Hereinafter, an antenna switching configuring/indicating method of the BS for the multi-panel UE, and a UE/BS operating method according to the corresponding method will be proposed.

As described above, the multi-panel UE may be classified into three following types.

- A UE in which multiple panels may not be simultaneously activated and only one panel may be activated at one timing. The corresponding UE may be based on MPUE-assumption 1 above.
- A UE in which multiple panels may be simultaneously activated and one or more multiple panels are utilizable even at the time of transmission. The corresponding UE may be based on MPUE-assumption 2 above.
- A UE in which multiple panels may be simultaneously activated and only one panel is utilizable at the time of transmission. The corresponding UE may be based on MPUE-assumption 3 above.

Proposals to be described below may be a proposal corresponding only to one type of UE among three types of UEs, and on the contrary, may also be a proposal corresponding all of two types or three types of UEs.

[Proposal 1]

Hereinafter, a UE capability for the panel switching operation and the SRS resource setting for the panel switching will be described.

The numbers of Tx panels and Tx panels which are utilizable by the UE may be defined as a UE capability. When the number of Tx panels is equal to or smaller than the number of Rx panels, a 'panel switching' operation of transmitting the SRS for each panel for acquiring the downlink channel state information (DL CSI) for each panel may be defined/configured.

The UE capability for the panel switching may be defined as the following formats.

"1Tp2Rp"(=one Tx panel two Rx panel)

"2Tp4Rp"(=two Tx panel four Rx panel)

"1Tp4Rp"(=one Tx panel four Rx panel)

The UE may report, to the BS, capability information for the panel switching.

When the SRS resource set(s) for the antenna switching usage may be configured for each panel, whether the corresponding SRS resource set(s) configured for each panel may be simultaneously transmitted may be defined as a capability.

Specifically, whether the BS may configure an individual SRS resource set(s) configured for each panel in the same slot or/and whether the BS may transmit the individual SRS resource set(s) or even whether the BS may configure SRS resources included in the individual SRS resource set configured for each panel in the same symbol and/or whether the UE may transmit the SRS resources may be defined as the UE capability.

When the capability of the UE is "1Tp2Rp", the existing Rel-15 NR antenna switching (e.g., "1T2R") may be indicated for each Rx panel. The UE may have the SRS resource set for the antenna switching usage related to each Rx panel. In this case, the SRS resource set for the antenna switching usage may be configured to the UE for each Rx panel. In this case, a concept of "1Tp2Rp" may be a higher level concept than "1T2R" by one step. A set (i.e., SRS resource setting for panel switching) of a higher concept enclosing a plurality of SRS resource sets from each panel needs to be newly defined.

Further, the multi-panel UE may report the capability information for the antenna switching equally or differently per panel.

For example, a case where a panel switching capability of a 2-panel UE is "1Tp2Rp", and "1T2R" is supported in a first panel and "1T4R" is supported in a second panel for each panel is assumed. In this case, in the capability related to the SRS resource setting for the panel switching, the UE may be configured to report, to the BS, integrated capability information by considering hierarchies of the panel switching and the antenna switching as in {"Tp2Rp" with "1T2R" for panel0 and "1T4R" for panel1}. Through this, the BS may configure/indicate, to the UE, the SRS for the panel switching and the antenna switching corresponding to the corresponding capability information.

Additionally, whether the SRS may be simultaneously transmitted based on the SRS resource set related to each panel and/or a time required for switching the panel may be included in the integrated capability information. For example, the UE may report, to the BS, capability information such as {"1Tp2Rp" with "1T2R" for panel0 and "1T4R" for panel1, whether the SRS resource set of each panel may be simultaneously transmitted (O or X), and the time required for switching the panel}.

The following configuration/indication may be considered with respect to which SRS resource set is related to which panel.

Specifically, in a higher layer configuration for configuring the SRS resource set from the BS (e.g., within SRS-ResourceSet which is IE of 3gpp TS 38.331 SRS-config), which panel the corresponding SRS resource set corresponds to may be configured/indicated.

The panel configuration/indication may be delivered to the DL CSI report of the UE, and the BS. When the UE reports the downlink channel state information (DL CSI) based on reception of the CSI-RS after reporting the number of Tx panels and the number of Rx panels, the UE may make a panel index be included. Through this, the BS may acquire a channel situation for each panel, and reflect the acquired channel situation to the SRS resource setting. The UE may report the integrated capability information for the SRS resource setting for panel switching according to a configuration/indication between the corresponding SRS resource set and the UE panel, and may operate based on a subsequent BS configuration/indication for the panel switching.

Hereinafter, an embodiment of the integrated capability information will be described.

[Method 1-1]

In the case of the UE in which one or multiple panels are utilizable at the time of transmission like MPUE-assumption 2, the integrated capability information may be reported as follows.

The corresponding UE may report, to the BS, capability information such as {"1Tp2Rp" with "1T2R" for panel0 and "1T4R" for panel1, whether the SRS resource set of each panel may be simultaneously transmitted: O, and the time required for switching the panel: 0 ms (optional)}.

The integrated capability information may include the information on whether the SRS resource set may be simultaneously transmitted. Further, the integrated capability information may optionally include the information on the panel switching delay.

[Method 1-2]

In the case of the UE in which only one panel is utilizable at the time of transmission like MPUE-assumption 1 and MPUE-assumption 3, the integrated capability information may be reported as follows.

The corresponding UE may report, to the BS, capability information such as {"1Tp2Rp" with "1T2R" for panel0 and "1T4R" for panel1, whether the SRS resource set of each panel may be simultaneously transmitted: X, and the time required for switching the panel: 2 ms (reporting is required)}.

The integrated capability information may include the information on whether the SRS resource set may be simultaneously transmitted and the panel switching delay. The panel switching delay may be requisitely included in the integrated capability information.

The reporting of the panel switching delay may be required or optional according to whether the SRS resource set may be simultaneously transmitted. The reason is that if the SRS resource set may be simultaneously transmitted, only a time required for turning on the panel (a time required for activating the panel) without considering the panel switching delay is considered.

[Method 1-3]

Items included in the integrated capability information based on Method 1-1 and/Method 1-2 above may be individually reported. As an example, the UE may individually report, to the BS, the information on the panel switching delay or whether the SRS resource set may be simultaneously transmitted.

[Proposal 2]

Hereinafter, a method for reducing inter-SRS beam interference at the time of an SRS configuration for the UE capable of simultaneously transmitting multi-panels (e.g., UE of MPUE-assumption 2) and at the time of simultaneously transmitting multi-panels will be described.

In the multi-panel UE (MPUE-assumption 2) in which multi-panels may be simultaneously activated, and one or a plurality of panels is utilizable even at the time of uplink transmission, if an SRS resource for the antenna switching usage is connected to different UE panels, SRS resources of each panel may be utilized for transmitting an SRS resource of another panel. Specifically, the BS may configure/instruct to the UE to transmit the SRS of another panel simultaneously (in the same symbol) in an SRS resource of any one panel among the multi-panels.

Specifically, the SRS resource set for the antenna switching for each panel of the multi-panel UE may separately exist. For convenience of description, this is referred to as an SRS resource set per panel. The term is just used for distinguishing from an SRS resource set without a panel related limitation, and a technical scope is not intended to be limited to the corresponding term.

The BS may configure the SRS resource set for each of the plurality of panels to the corresponding UE in the same slot. In other words, the BS may configure SRS resource sets based on different panels in the same slot.

Further, the BS may configure the SRS resource which belongs to the SRS resource set for each of the plurality of panels in the same slot. The corresponding UE may transmit SRSs based on different panels in the same symbol.

It is impossible for a UE based on MPUE-assumption 1 and MPUE-assumption 3 in which only one panel is utilizable at the time of uplink transmission to simultaneously respective SRSs through the SRS resources based on different panels. The operation of the UE based on MPUE-assumption 2 described above is impossible. Accordingly, the panel switching delay should be considered between SRS transmissions from different panels.

Further, the following operation may be considered so as to minimize inter-beam interference between the SRS resources simultaneously transmitted by the UE (in the multi-panels).

The BS may i) configure only one time domain symbol level location of the SRSA resource or ii) configure the time domain symbol level location in a time domain symbol level position candidate set form, to the UE.

When the simultaneously transmitted SRS resources are configured/triggered through the configuration, the BS may configure/indicate/update each SRS resource so that SRS beam interference from two panels is minimized through MAC/CE/DCI. That is, the BS may configure/indicate/update a combination in which the beam interference is minimized in the set, to the UE.

The following matters related to channel estimation for the UE such as MPUE-assumption 2 capable of simultaneously transmitting the SRSs based on different panels may be considered. In order to increase a channel estimation capability for the SRSs transmitted based on different panels (based on the SRS resource of the SRS resource set for each of different panels) in the same symbol, it may be preferable that the SRS is transmitted through an orthogonal beam between respective SRS resources. Here, orthogonal may mean that directions of respective beams are different, so the beams do not overlap with each other.

In order to improve the channel estimation capability of the BS, the inter-beam interference of the SRSs which are simultaneously transmitted based on different panels may be considered.

For example, when candidate positions of the symbol level position of the SRS resource are indexed from a last symbol of the subframe as 0 to 5, the UE/BS may operate as in Samples 1 and 2 below according to a consecutive symbol duration value. For reference, in the case of Rel-15 NR, a starting portion is configured to one of 0 to 5 through RRC and consecutive symbol numbers 1, 2, and 4 are configured.

Sample 1) When the consecutive symbol duration is 1: The BS may configure the symbol level position candidate set to the UE through the RRC as follows.

SRS resource 1(from panel 1)={3, 5}

SRS resource 2(from panel 1)={3, 5}

SRS resource 3(from panel 2)={3, 5}

SRS resource 4(from panel 2)={3, 5}

The BS may indicate a specific combination among the candidate sets to the UE through the MAC CE/DCI as follows.

SRS resource 1(from panel 1)={3}

SRS resource 2(from panel 1)={5}

SRS resource 3(from panel 2)={5}

SRS resource 4(from panel 2)={3}

The BS may configure/indicate/update whether SRS resource 1 and SRS resource 4 are simultaneously transmitted and SRS resource 2 and SRS resource 3 are simultaneously transmitted through the MAC CE or DCI n bits.

Through a dynamic configuration/indication for the symbol level position for the SRS resource as described above, the inter-beam interference of the SRS resources to be simultaneously transmitted from the respective panels may be minimized.

The method may reduce signaling overhead, and when the number of panels of the UE which are simultaneously transmitted is larger than 2, the corresponding effect t may be prominent.

Specifically, the signaling overhead is reduced in a configuration between the BS and the UE to arrange the beams so that the inter-beam interference is small by configuring the candidates at the symbol level position of each SRS resource as compared with updating all spatial relations in order to reduce the inter-beam interference of the respective SRS resources transmitted from different panels.

Further, the embodiment may be applied to a case where SRSs of a plurality of UEs are multiplexed in a limited time-frequency domain. In order to reduce SRS inter-beam interference of UEs scheduled to simultaneously transmit the SRSs, the BS may configure the symbol level position of the SRS resource of each UE.

Sample 2) When the consecutive symbol duration is 2 or more: The BS may configure/indicate a symbol level starting position candidate and symbol durations 1, 2, and 4 to the UE through the RRC in a combination form.

SRS resource 1(from panel 1)={(starting=3,duration=2), (starting=5,duration=1)}

SRS resource 2(from panel 1)={(starting=3, duration=2), (starting=5, duration=1)}

SRS resource 3 (from panel 2)={(starting=3,duration=2), (starting=5, duration=1)}

SRS resource 4(from panel 2)={(starting=3,duration=2), (starting=5,duration=1)}

The BS may configure/indicate by which order pair the configured sets are to be down-selected and transmitted for each SRS resource among the configured sets through the MAC CE or DCI n bits.

The operation between the BS and the UE may be extensively applied even to a case where the number of panels of the UE is 3 or more (e.g., 4). A configuration/indication of information (e.g., a candidate set configuration, and an indication of a specific set among the candidate sets) according to Proposal 2 above may be related to the SRS resource setting for the panel switching of Proposal 1 above. As an example, the candidate set may be configured/indicated through the SRS resource setting for the panel switching.

[Proposal 3]

Hereinafter, an SRS configuration in a UE (e.g., a UE of MPUE-assumption 1 or MPUE-assumption 3) in which simultaneous transmission of multi-panels is impossible, an SRS configuration considering the panel switching delay, and a UE/BS operation related to the corresponding configuration will be described.

In a UE (MPUE-assumption 1) in which multi-panels may not be activated simultaneously and only one panel may be activated at one timing and a UE (MPUE-assumption 3) in which multi-panels may be activated, but only one panel is utilizable at the time of transmission, the following method may be considered.

When the SRS resource set for the antenna switching usage is connected to different UE panels in the above-described UE (based on MPUE-assumption 1 or MPUE-assumption 3), the BS may configure the SRS resource setting by considering a time (e.g., panel switching delay) required for the corresponding UE to switch the panel.

Specifically, the BS may configure a guard period or a gap period for panel switching between respective SRS resource sets. Accordingly, the ambiguity on the UE operation may be prevented.

The 'guard period for panel switching' may be configured/indicated through the SRS resource setting for panel switching of Proposal 1 above. That is, the SRS resource setting may be constituted by a combination of SRS resource sets (SRS resource sets for antenna switching) configured for each panel by considering the guard period for panel switching.

In other words, the SRS resource set for antenna switching and the SRS resource setting for panel switching may be configured in a hierarchical structure. Specifically, in each panel, at least one SRS resource set for antenna switching may be configured. In this case, the SRS resource setting for panel switching, which may bind (or includes) the configured sets (by considering the 'guard period for panel switching') may be configured. An example of UE capability information (Proposal 1) related thereto is as follows.

{"1Tp2Rp" with "1T2R" for panel0 and "1T4R" for panel1, whether the SRS resource set of each panel may be simultaneously transmitted: X, and the time required for switching the panel: 2 ms (reporting is required)}

The BS may configure the guard period for panel switching by utilizing the SRS resource setting for panel switching. Specifically, the BS may configure the 'guard period for panel switching' by setting a slot level time domain gap considering the panel switching delay for each UE capability between the 'SRS resource sets for antenna switching' of each panel.

The BS may configure the SRS resource set for antenna switching from each panel throughout one or two slots in the same manner as the existing REL-15. The BS may configure the SRS resource in a form considering a symbol gap for antenna switching in the corresponding slot.

Through the scheme, the BS may configure/indicate, to the UE, the 'guard period for panel switching' and the 'symbol gap for antenna switching' in the hierarchical structure.

According to an embodiment, the UE/BS may operate in relation to the SRS resource setting for panel switching as follows.

It is assumed that the UE incapable of simultaneously transmitting the SRS resource, such as MPUE-assumption 1 and MPUE-assumption 3 includes two panels and the antenna switching related capability for each panel is "1T2R". In this case, the UE may report, to the BS, that the UE capability related to the antenna switching is "1T4R" by considering up to the panel switching.

The UE may support up to the panel switching by maintaining the antenna switching capability of the existing scheme. The UE may separately report, to the BS, only the guard period for panel switching)(e.g., 2 ms or the number of slots)' as the UE capability.

The operation of the UE may be performed in a UE capability range during the panel switching through the operation between the BS and the UE.

The time (e.g., panel switching delay) required for switching the panel of each panel may be defined as the UE capability (e.g., the guard period for panel switching) as described above. The UE reports the corresponding capability to the BS not to expect the SRS resource sets from each panel, which are configured/indicated in a state to be separated at a smaller time interval than the corresponding delay. The BS may configure/indicate the SRS resource setting for panel switching so as to place the guard period for panel switching between the SRS resource sets of each panel by considering the reported capability information (panel switching delay). When an SRS transmission indication to another panel is received from the BS within the 'guard period for panel switching' of the UE, the corresponding SRS transmission indication is discarded or the indicated SRS is transmitted by maintaining a previously transmitted panel as it is.

There may be SRS resource sets (SRS resource sets for antenna switching) for two or more (e.g., four) panels within panel switching SRS resource setting.

[Proposal 4]

Hereinafter, a UE operation when the panel receiving the DCI for triggering the SRS and the panel to transmit the SRS do not match each other will be described.

In a UE (MPUE-assumption 1) in which multi-panels may not be simultaneously activated, and only one panel may be activated at one timing and in a UE (MPUE-assumption 3) in which multi-panels may be simultaneously activated, but only one panel is utilizable at the time of transmission, the following method may be considered.

When a panel switching guard period is defined as the UE capability information, the Rx panel receiving the DL/UL DCI for triggering the SRS and the Tx panel of the indicated SRS may be different. In this case, the UE may operate as follows.

1) If a temporal location of the SRS triggered from a DCI reception timing is after the panel switching guard period, the UE may normally transmit the SRS after the panel switching in response to the DCI indication.

2) If the temporal location of the SRS triggered from the DCI reception timing is within the panel switching guard period, the UE may use a pre-defined default UL panel. The pre-defined default UL panel may include a UL panel corresponding to a lowest CORESET, and a pre-defined/configured fallback UL panel.

Alternatively, the UE may transmit the SRS by using a UL panel which corresponds to (or is the same as) a DL panel (Rx panel) used when receiving the DCI.

Hereinafter, an example of a UE/BS operation based on at least one of Proposals 1 to 4 described above is as follows.

Step 0) The UE reports, to the BS, a panel related capability (the number of Tx/Rx panels, whether multi-panels may be simultaneously transmitted, and the panel switching delay).

Step 0-1) Perform reporting as in Proposal 1

Step 0-1-1) Simultaneous transmission for each panel is possible Proposal 2

Step 0-1-2) Simultaneous transmission for each panel is impossible Proposal 3

Step 1) The UE receives the SRS configuration from the BS.

Step 1-1) Receive a configuration for transmitting the SRS

Step 0-1-1) Information which may be included in the configuration is (TS 38.331 SRS-Config)

Step 1-2) Transmit the SRS periodically/semi-statically/aperiodically

Step 2) When a) A timing when the UE receives, from the BS, SRS trigger through UL/DL grant (through PDCCH) or b) an RRC/MAC CE configuration based on SRS transmission timing arrives Step 2-1) UE capable of simultaneous transmission for each panel Step 2-1-1) Operation by Proposal 2

Step 2-2) UE incapable of simultaneous transmission for each panel

Step 2-2-1) Operation by Proposal 3

Step 2-3) When the SRS is triggered through the DCI, but the DCI receiving panel and the panel to transmit the SRS are different Step 2-3-1) Operation by Proposal 4

All of the respective steps are not required, and some step may be omitted according to a situation of the UE.

Hereinafter, effects according to Proposals 1 to 4 will be described in detail.

The effect according to Proposal 1 is as follows. When beamforming is utilized (in a band of FR 2 or more), a channel situation between multi-panels mounted on the BS and the UE may vary for each panel. When the number of Tx panels is equal to or smaller than the number of Rx panels, it is possible to acquire the DL CSI for each panel.

The effect of Proposal 2 is as follows. By considering the panel switching delay which may have a larger switching gap than the existing NR antenna switching, simultaneous transmission from multi-panels may be supported in transmitting the SRS for the antenna switching usage. Further, an arrangement of SRS beams of each panel, which are transmitted in the same symbol may be performed so that interference between respective SRS beams is small. The location of the SRS resource may be dynamically configured/indicated so that the inter-beam interference of the simultaneously transmitted SRSs is small.

The effect of Proposal 3 is as follows. When the UE antenna switching for the DL CSI acquisition usage is supported even between two or more panels, a UE operation considering the panel switching period is defined. An impractical UE operation may be prevented by considering a time (e.g., panel switching delay) required for the UE which may not utilize two panels together for transmission to switch the panel. That is, since the UE transmits the SRS within a range of a capability related to panel switching, reliability of SRS transmission for antenna switching may be secured.

The effect of Proposal 4 is as follows. When the Rx panel receiving the DL/UL DCI in which the SRS is triggered and the Tx panel of the indicated SRS are different, the ambiguity of the UE operation may be resolved, which may occur according to the UE capability.

In Rel-15 NR MIMO, SRS transmission for antenna switching for efficiently acquiring DL CSI is supported for a UE in which the number of Tx antennas (chains) is less than the number of Rx antennas (chains). A UE supporting antenna switching may report, to a base station, one of {"1T2R", "1T4R", "2T4R", "1T4R/2T4R", "T=R"} as a capability, and the base station may configure an SRS resource set and SRS resources for antenna switching corresponding to the capability and indicate a transmission.

In Rel-16 NR standard, a new UE capability for the antenna switching has been defined. There is a possibility in which antenna switching will be supported for a UE having more than 4 Rx antennas in the future. This is that the UE can have up to 8 Rx antennas (Rx chains) for an eMBB operation because in the current NR standard, the max number of UL layers or the max number of Tx chains for the UE is 4, and the max number of DL layers supportable for one UE is 8.

When the number of Tx chains is less than the number of Rx chains as above, an antenna switching operation efficiently enables reciprocity based DL channel estimation. However, because time required to perform switching on a large number of antennas increases, there may be a problem in which antenna switching is not completed within a single UL slot. Further, even if antenna switching is performed across a plurality of UL slots, when the plurality of UL slots are far apart in time, channels between UL slots may be greatly altered, and thus it may be difficult to obtain accurate DL CSI. There is a possibility in which explicit/implicit UL panel index (e.g., P-ID) of the UE will be utilized in UL channel/RS transmission. In this instance, if the concept of panel is introduced even in an antenna switching procedure, additional issues, such as a panel switching time that need to be considered, may arise. The present disclosure describes a method for a base station to configure/indicate antenna switching to a UE having more than 4 Rx antennas based on such a background, and describes an antenna switching operation of a subsequent UE.

Hereinafter, in the present disclosure, "transmission of an SRS resource set" may be used in the same meaning as "transmitting an SRS based on information configured to the SRS resource set", and "transmitting an SRS resource" or "transmitting SRS resources" may be used in the same meaning as "transmitting an SRS or SRSs based on information configured to the SRS resource". Further, "performing SRS antenna switching" may be used in the same meaning as "transmitting the SRS resource set or SRS resource for antenna switching purpose". An enhanced SRS after Rel-17 is referred to as an "additional SRS" or an "enhanced SRS", and a UE supporting the additional (enhanced) SRS is referred to as an "additional UE" or an "enhanced UE". In this regard, legacy SRS refers to an SRS for which up to 4 symbols can be configured (legacy SRS configuration), and the enhanced SRS (additional SRS) refers to an SRS for which symbols more than 4 symbols can be configured (enhanced SRS (additional SRS) configuration). This is merely for convenience of description and is not intended to limit the technical scope of the present disclosure. For example, the SRS for which up to 4 symbols can be configured may be referred to as a first SRS, and the SRS for which symbols more than 4 symbols can be configured may be referred to as a second SRS. Hence, the legacy SRS configuration may be referred to as a first SRS configuration, and the enhanced SRS (additional SRS) configuration may be referred to as a second SRS configuration. In the present disclosure, means 'and' or 'or' or 'and/or' based on the context.

The following methods 1) and 2) are described below.

1) Method for a base station to configure/indicate an SRS for antenna switching purpose to a UE having more than 4 Rx antennas (or Rx chains) (i.e., 5 or more Rx antennas (or Rx chains))
2) Method of transmitting an SRS for antenna switching purpose of a subsequent UE

[Proposal 5]

A UE having more than 4 Rx antennas (i.e., 5 or more Rx antennas) of a base station may operate based on the following UE capability reporting method. The UE capability reporting method may be performed before an SRS resource set and/or SRS resource for antenna switching purpose is configured to the UE.

Before the UE is configured with the SRS resource set and/or SRS resource for antenna switching purpose by the base station, the UE may report information for at least one of the following 1) to 3) in the form of UE capability.

1) Whether simultaneous transmission is possible for how many Tx antennas (i.e., SRS antenna ports) (based on the number of Tx antennas (or Tx chains) and the number of Rx antennas (or Rx chains) of the UE)
2) The number of Rx antennas (or Rx chains) included in the UE
3) Information on whether sounding for reciprocity based DL CSI acquisition can (or will) be performed for how many Rx antennas For example, the UE may report the UE capability in the form of "2T6R" to the base station. In this case, "2T6R" represents that i) the UE can perform the simultaneous transmission for two Tx antennas (two Tx chains) and ii) the UE can perform the sounding for six Rx antennas.

For another example, the UE may report the UE capability in the form of "4T8R" to the base station. In this case, "4T8R" represents that i) the UE can perform the simultaneous transmission for four Tx antennas and ii) the UE can perform the sounding for eight Rx antennas.

Here, in the reporting of UE capability in the form of "xTyR", y may not necessarily be divided by x. This means that in each SRS transmission occasion for antenna switching, overlapping Rx (Tx) antenna port(s) may exist for each occasion (per transmission of each SRS resource set or per transmission of each SRS resource), and the corresponding operation may be configured/switched/updated/indicated by the base station.

The base station enables configuration for SRS resource set/SRS resource (for antenna switching) in the subset form of UE capability based on the reporting of UE capability. For example, the UE may report the UE capability in the form of 4T6R. The base station may configure SRS resource set/SRS resource corresponding to 4T6R. The base station may also perform configuration of SRS resource set/SRS resource, such as 2T6R, that is the subset form of the corresponding configuration, and may configure/indicate SRS transmission based on the corresponding configuration. In such an operation, a maximum capability supported by the UE is not configured by the base station and is configured in a subset form, and thus in the UE operation, it can have an effect of saving power or preventing excessive strain on the UE operation.

In addition, when the UE reports the capability for antenna switching, the UE may report whether the corresponding "xTyR" reporting is i) a possible configuration in one panel or ii) a possible configuration across multiple panels. That is, the UE can report how many panels are related to the antenna switching operation of SRS. Further, "xTyR" reporting may be performed separately/individually for each panel of the UE. In this instance, a report on whether the SRS antenna switching operation for multiple panels can be completed within a single UL slot may be accompanied with the capability reporting depending on whether there is a panel switching delay. The base station receiving the capability reporting for each panel may perform i) SRS resource set/SRS resource configuration for integrated "xTyR" of all the panels or ii) separate SRS resource set/SRS resource configuration for "xTyR" for each panel, based on antenna switching capability for each panel.

[Proposal 6]

The following is proposed a method of configuring SRS resource set and/or SRS resource for antenna switching purpose for a UE having more than 4 Rx antennas of a base station based on the UE capability reporting of the proposal 5 for antenna switching.

When the UE reports the capability as in the proposal 5, the base station may perform the following SRS configuration based on whether the corresponding "xTyR" reporting is i) a report/configuration for one panel (or a single-panel UE) or ii) a report/configuration for multiple panels (or a multi-panel UE).

i) In Case of Report/Configuration for One Panel (or Single-Panel UE)

The base station may configure one or multiple SRS resource set(s) for antenna switching configuration for UE single-panel and configure/indicate to perform SRS antenna switching of the subset form of "xTyR" reported by the UE.

i-1) if the Base Station Configures One SRS Resource Set Based on "xTyR" Reported by the UE The base station may configure the one SRS resource set to the UE when the number of symbols based on SRS resources within an SRS resource set for antenna switching purpose including a gap symbol does not exceed the number of available SRS symbols within a slot which will configure/indicate transmission.

For example, it may be assumed that the UE has reported an antenna switching related capability, such as "2T8R", and the base station performs configuration for SRS resource set/SRS resource based on the corresponding reporting. The base station may configure 2-port SRS resource having four 1-symbols within one SRS resource set. In this instance, since four SRS symbols and three gap symbols are required to complete antenna switching based on the corresponding configuration (the gap symbols may vary depending on a subcarrier spacing), the base station may configure/indicate, to the UE, transmission of the corresponding SRS resource set to a slot in which SRS symbol resources of 7-symbol or more are available.

In other words, if resources for transmission of the SRS resource set for antenna switching purpose are insufficient, i.e., cell-specific SRS symbol resources and/or UE-specific SRS symbol resources (in a specific slot or in all UL slots) are insufficient, the base station cannot configure/indicate the transmission of the SRS resource set and shall update configuration for the SRS resource set. For reference, in the case of legacy SRS, transmission can be configured/indicated in last 6 symbols within a slot, but in the case of additional (enhanced) SRS, there is a possibility that all 14 symbols within a slot will be utilized, and cell-specific SRS resources or/and UE-specific SRS resources will become a subset of the 14 symbols.

i-2) if the Base Station Configures a Plurality of SRS Resource Sets Based on "xTyR" Reported by the UE The base station may configure the plurality of SRS resource sets to the UE when the number of symbols of SRS resources within an SRS resource set for antenna switching purpose including a gap symbol exceeds the number of available SRS symbols within a slot which will configure/indicate the transmission.

For example, when the UE has reported an antenna switching related capability, "1T6R", and the base station performs configuration for SRS resource set/SRS resource based on the corresponding reporting, if the base station configures 1-port SRS resource having six 1-symbols within one SRS resource set, six SRS symbols and five gap symbols are required to complete antenna switching based on the corresponding configuration (the gap symbols may vary depending on a subcarrier spacing). In this instance, if there is a slot in which 11 SRS symbol resources are available, the base station may perform the corresponding configuration to the UE and then configure/indicate SRS transmission to the UE. If there is not slot in which 11 SRS symbol resources are available, the base station may configure/indicate configuration/transmission of a plurality of (e.g., 2 or 3) SRS resource sets to the UE.

If resources for performing configuration/transmission of a single SRS resource set are insufficient, i.e., cell-specific SRS symbol resources and/or UE-specific SRS symbol resources (in a specific slot or in all UL slots) are insufficient, the base station may perform configuration/transmission of a plurality of (e.g., 2 or 3) SRS resource sets to the UE. For the example above, the base station may configure two SRS resource sets to configure 1-port SRS resource having three 1-symbols to one SRS resource set and to configure 1-port SRS resource having three 1-symbols consisting of ports different from ports of previous resources to the other SRS resource set. This is merely an example, and the base station may equally or unequally configure the number of SRS resources for each SRS resource set (e.g., two SRS resources may be configured to a first SRS resource set, and four SRS resources may be configured to a second SRS resource set).

Characteristically, the plurality of SRS resource sets configured as above may be configured as follows to prevent a transmission from being configured/indicated to the same UL slot. A plurality of SRS resource sets may be configured to have different periodicity and offset (periodicityAndOffset) values (in the case of periodic/semi-persistent SRS resource set) or have different slot offsets (slotOffset) (in the case of aperiodic SRS resource set). Configuration of the plurality of SRS resource sets may be performed based on at least one of the following ① to ③.

① There may be a restriction on a difference in a time domain between UL slots (e.g., a time interval (n slots) between UL slots) in which the plurality of SRS resource sets are transmitted due to the different periodicityAndOffset/slotOffset (i.e., restriction that transmission of the plurality of SRS resource sets shall be completed within n slots). The restriction may be configured considering the following. There may occur a channel variation between SRS resource sets for antenna switching due to a time domain corruption of radio channels. In this case, because it may be difficult to obtain accurate DL CSI for all the Rx antenna ports, a limit may be configured on a temporal distance between the sets.

② In each SRS transmission occasion for antenna switching in UE capability reporting/configuration such as "xTyR" of the proposal 5 (y is not necessarily be divided by x), the base station may configure "xTyR" (e.g., 4T8R, 2T8R, 4T6R, 2T6R, 3T4R, 2T4R, etc.) antenna switching to the UE so as to place overlapping Rx (Tx) antenna ports for each occasion. In this instance, the number of overlapping SRS antenna ports and a port index per the plurality of SRS resource sets/SRS resources may be configured/indicated by the base station. The overlapping Rx (Tx) antenna port may mean one or more Rx (Tx) antenna port(s) equally configured between SRS resources/SRS resource sets. The antenna port thus configured may be a default port or a main port of the UE and may be a port with the best transmit/receive performance.

For example, in "4T6R" configuration, a port in which two ports overlap may be configured. Specifically, the base station may pre-configure/pre-indicate an overlapping port between different SRS resource sets/SRS resources for two port indexes (i.e., port index 0 and port index 2) of six Rx (Tx) antennas.

If two SRS resources has been configured in an SRS resource set of the "4T6R" configuration, the UE sounds port indexes 0, 1, 2, 3 in one SRS resource and sounds port indexes 0, 2, 4, and 5 in another SRS resource (by the overlapping port configuration configured by the base station).

Alternatively, performing the sounding on which Rx (Tx) antenna port(s) for each SRS resource may be included in direct configuration (RRC)/update (MAC CE)/indication (DCI) of the base station. If there is an overlapping SRS port in SRS transmission occasion thus overlapped, there is an advantage in that the base station can obtain channels for all the antenna ports, in which a shifted phase due to time of a channel coefficient is compensated through the overlapping ports even if a temporal corruption of the radio channel occurs because a temporal distance between the transmitted SRS resource sets/SRS resources is far.

③ The base station may perform grouping for Rx (Tx) antenna ports performing the sounding per SRS resource set/SRS resource, and then configure it to the UE so that groups according to the grouping are rotated. For example, in "2T4R" antenna switching operation, the base station may perform configuration in the form in which a port index sounded for each SRS transmission occasion (per transmission of each SRS resource set or per transmission of each SRS resource) is rotated as in {(0,2), (1,3), (0,1), (2,3)}. Antenna port group rotation information may be pre-configured by the base station. The method ③ can achieve the same effect as the method ② through the group rotation. The methods ①, ②, and ③ may be pre-configured before SRS transmission, and may be indicated when the base station configures (RRC)/activates (MAC CE)/indicates (DCI) the SRS transmission to the UE.

Alternatively, when the base station intends to perform configuration beyond the restriction (temporal distance difference, e.g., n slots) of the method ①, the base station may use configuration of the method ② or/and the method ③ for the UE.

In particular, the method ② or/and the method ③ may be limited to be used in SRS resource set configuration having 'usage' for DL/UL partial reciprocity usage (i.e., where information related to angle(s) and delay(s) are estimated at the base station based on SRS by utilizing DL/UL reciprocity of angle and delay, and the remaining DL CSI is reported by the UE) in a FDD system in the SRS resource set purpose. The above purpose is valuable in that more accurate reciprocity based DL CSI information can be obtained through the method ② or/and the method ③.

The UE expects that all of spatialRelationInfo (or UL-TCI state) configurations of all the SRS resources within one or the plurality of SRS resource set configuration(s) in the i-1) and i-2) are the same. (Alternatively, the base station allows such a configuration to be performed by the UE.) This means that one or the plurality of SRS resource set configuration(s) is configuration for one panel. Further, there is an effect that DL CSI acquisition can be achieved under the same condition by finishing the sounding for each antenna within one panel using the same Tx beam.

ii) In Case of Report/Configuration for Multiple Panels (or Multi-Panel UE)

The base station may configure one or multiple SRS resource set(s) for antenna switching configuration for UE multi-panel and configure/indicate to perform SRS antenna switching of the subset form of "xTyR" reported by the UE. The criteria for configuring the one or multiple SRS resource set(s) are as follows.

ii-1) if the Base Station Configures One SRS Resource Set for UE Multi-Panel

As in the i-1), available SRS symbol resources are sufficient, and because the UE is a panel in which simultaneous activation for multiple Rx (Tx) panels is possible, there is no or very little delay in a panel switching operation for antenna switching (i.e., operation to complete all antenna switching for each panel), and thus the panel switching operation may be possible within a single UL slot. In this instance, the base station may configure one SRS resource set to the UE and configure the UE to perform SRS antenna switching operation for/across multi-panel within the single UL slot. The present embodiment may be applied when the UE is based on MPUE-Assumption 2 and MPUE-Assumption 3. In this case, configuration/indication of the base station and operation of the UE for SRS antenna switching may be the same as the i-1). Specifically, the UE reports, to the base station, information that SRS antenna switching can be completed within the single UL slot in an SRS antenna switching capability for the multi-panel, and "xTyR" (or integrated "xTyR" of all the panels) for each panel, as capability information, and the base station configures a single SRS resource set for antenna switching across the multi-panel to the UE.

Characteristically, spatialRelationInfo (or UL-TCI state) configurations of SRS resources within one SRS resource set for SRS antenna switching for the multi-panel may be different from each other (unlike legacy operation). The UE assumes that an SRS resource having different spatialRelationInfo (or UL-TCI state) among the configured SRS resources is SRS resource configuration from different panels. (Alternatively, the base station performs such a configuration on the UE.)

The configuration/transmission order within a single UL slot of antenna switching SRS resource corresponding to a different panel may be predefined/pre-configured by the base station to the UE. Alternatively, panel ID (P-ID) is configured to each SRS resource or P-ID is configured/linked to spatialRelationInfo (or UL-TCI state), and thus the UE can explicitly recognize that SRS resources within an SRS resource set are SRS resources from which panel. As above, when it is possible to recognize between the base station and the UE for the explicit UE panel, spatialRelationInfo of all the SRS resources may be configured as follows.

In configuration of the SRS resource set for antenna switching including panel switching, spatialRelationInfo (or UL-TCI state) of the SRS resource may be limited to configure only DL RS (i.e., SSB, CSI-RS). The UE expects that only one identical DL RS will be configured to reference RS of spatialRelationInfo of all the SRS resources from all the panels (i.e., SRS resource set). Hence, a beam of SRS (resource) from each panel is a transmission beam correspondent to a reception beam when receiving the DL RS.

The purpose of the above configuration is as follows. In case of SRS antenna switching for each panel, since a beam of SRS resource transmitted from each panel cannot be a completely identical beam, all reference RSs for (analog) beam configuration are configured to the same DL RS. From a perspective of the base station, DL CSI may be estimated under the same condition by receiving SRS from all the panels with the same reception beam (e.g., a reception beam correspondent to a transmission beam of DL RS). After the base station estimates more accurately DL CSI across multiple Rx panels of the UE, the base station may configure/indicate reception of the multiple Rx panels to subsequent PDSCH scheduling to allow the UE to receive PDSCH.

ii-2) if the Base Station Configures a Plurality of SRS Resource Sets for UE Multi-Panel For a UE that cannot complete an SRS antenna switching operation for/across multi-panel within a single UL slot since a delay occurs in units of x [ms] or n [slot] in a panel switching operation for antenna switching (i.e., operation to complete all antenna switching for each panel), the following method may be considered.

The base station may configure a plurality of SRS resource sets to the UE and configure the UE to perform the SRS antenna switching operation for/across multi-panel in a plurality of UL slots considering a panel switching delay. (Alternatively, the UE expects such a configuration.) The present embodiment may be applied when the UE is based on MPUE-Assumption 1. In this case, configuration/indication of the base station and operation of the UE for SRS antenna switching may be the same as the i-2). That is, the UE may report, to the base station, information that SRS antenna switching cannot be completed within a single UL slot in an SRS antenna switching capability for the multi-panel, and “xTyR” (or integrated “xTyR” of all the panels) for each panel, as capability information. The base station configures a plurality of SRS resource sets for antenna switching across the multi-panel to the UE. In the same manner as the i-2), the plurality of SRS resource sets for the multi-panel may be configured to have different periodicityAndOffset values (in the case of periodic/semi-persistent SRS resource set) or have different slotOffset (in the case of aperiodic SRS resource set), in order to prevent transmission from being configured/indicated to the same UL slot. Since the same problem as the i-2) may occur, the methods ①, ②, and ③ can be equally used in the ii-2).

Characteristically, spatialRelationInfo (or UL-TCI state) configurations of SRS resources within a plurality of SRS resource sets for the plurality of panels may vary in units of SRS resource set or may be the same. The UE always expects the same spatialRelationInfo (or UL-TCI state) configuration within the SRS resource set. (Alternatively, the base station performs such a configuration on the UE.) Hence, there is an effect that DL CSI acquisition can be achieved under the same condition within one panel by finishing the sounding for each antenna within one panel using the same Tx beam. Alternatively, P-ID is configured to each SRS resource set or P-ID is configured/linked to spatialRelationInfo (or UL-TCI state), and thus the UE can explicitly recognize that a specific SRS resource set is an SRS resource set from which panel. As above, when it is possible to recognize between the base station and the UE for the explicit UE panel, spatialRelationInfo of all the SRS resources may be configured as follows.

In configuration of the plurality of SRS resource sets for antenna switching including panel switching, spatialRelationInfo (or UL-TCI state) of the SRS resource may be limited to configure only DL RS (i.e., SSB, CSI-RS). The UE expects that only one identical DL RS will be configured to reference RS of spatialRelationInfo of all the SRS resources from all the panels (i.e., the plurality of SRS resource sets). Hence, a beam of SRS (resource set/resource) from each panel is a transmission beam correspondent to a reception beam when receiving the DL RS.

The purpose of the above configuration is as follows. In case of SRS antenna switching for each panel, since a beam of SRS resource transmitted from each panel cannot be a completely identical beam, all reference RSs for (analog) beam configuration are configured to the same DL RS. From a perspective of the base station, DL CSI may be estimated under the same condition by receiving SRS from all the panels with the same reception beam (e.g., a reception beam correspondent to a transmission beam of DL RS). After the base station estimates more accurately DL CSI across multiple Rx panels of the UE, the base station may configure/indicate reception of the multiple Rx panels to subsequent PDSCH scheduling to allow the UE to receive PDSCH.

As another embodiment related to the operation of the ii), the following methods may be considered.

In an antenna switching operation for the UE multi-panel, the base station may configure the UE so that SRS configuration from each of different panels corresponds to each of different SRS resource sets, in order to support a switching operation between multiple panels and simultaneous transmission across multi-panel. That is, it may be configured so that each SRS resource set corresponds to each panel. Because a process for SRS power control is performed in units of SRS resource set, it is possible to configure SRS resource set/SRS resource corresponding to the power control for each panel through the configuration operation.

For example, when a total UL max power of a UE including two panels is 23 dBm, and the UE can perform the simultaneous transmission across multi-panel, the UE will perform the power control for each panel so that max power for each panel is 20 dBm.

Based on the MPUE-Assumption, configuration of SRS resource set(s) for antenna switching purpose for the multi-panel of the UE of the base station may vary. For example, for a UE capable of performing the simultaneous transmission across multi-panel as in the MPUE-Assumption2, a) there may be a method of performing the simultaneous transmission across multi-panel and completing antenna switching, b) there may be a method of performing panel switching for one panel after completing antenna switching from the one panel, and then performing antenna switching for remaining panels.

The UE operation described in the a) and b) may be switched/configured/updated/controlled by configuration of the base station. For example, in panel configuration of any UE, it is assumed that Rx (Tx) antenna port index (1,2) is included in panel 1, and Rx (Tx) antenna port index (3,4) is included in panel 2 (SRS resource set 1 for panel 1, and SRS resource set 2 for panel 2). In this instance, “2T4R” antenna switching operation configuration of the base station may be (1,3)(simultaneous transmission across multi-panel)→(2,4) (simultaneous transmission across multi-panel) as in the a) and may be performed as (1,2)(simultaneous transmission) →(3,4)(simultaneous transmission) as in the b).

In the above example, in the operation of the a), for the simultaneous transmission across multi-panel, because two resources in one panel need to be located in different two symbols, two SRS resources representing each port index (SRS resource 1/2 for set 1 and SRS resource 3/4 for set 2) shall be configured in each of SRS resource set 1 and SRS resource set 2.

On the other hand, since the operation of the b) is a form in which panel switching is performed after simultaneous transmission of two ports in one panel, one 2-port SRS resource may be configured in each of SRS resource set 1 and SRS resource set 2. As described above, the configuration of the base station shall vary depending on operation configuration/indication in the a) and the b). In this instance, if a power control process is performed in units of SRS resource set, SRS transmission using a UE max transmission power (i.e., 23 dBm) is possible because the simultaneous transmission across multi-panel is performed in the operation a), and SRS transmission using a max transmission power (i.e., 20 dBm) of a specific panel is possible because 2 port SRS resources within one SRS resource set (panel) in the operation b) are transmitted in one timing. The operations a) and b) have an advantage that the base station can freely configure based on a system scenario (if it is determined that the SRS interference is severe, the operation b) is configured/indicated).

As in MPUE-Assumption 1 or MPUE-Assumption 3, for a UE in which the simultaneous transmission across multi-panel is impossible, only the operation b) can be supported. In this case, the base station will have to perform configuration of SRS resource set(s) for UE multiple panels for the operation b).

For the above-described operation, P-ID may be implicitly/explicitly linked/configured in units of SRS resource set.

Alternatively, in the above-described operation, as a method for the base station to switch/configure/control the operations a) and b) to the UE, the operations a) and b) may be controlled in a form in which the base station enables/disables SRS full power (max power) transmission of the UE (i.e., achieving full power of 23 dBm upon the simultaneous transmission across multi-panel with 20 dBm for each panel in the above example) while performing SRS configuration across multiple UE panels. For example, if the SRS full power transmission is enabled, the UE performs the operation a) since full power transmission can be achieved when the simultaneous transmission across multiple panels is performed. On the contrary, if the SRS full power transmission is disabled, the UE performs the operation b). For these operations, the UE may report, to the base station, whether to support the full power transmission as related capability information (e.g., accompanied with a reporting of "2T4R" related SRS antenna switching capability). If the full power transmission is supported by the UE, the base station may indicate switching of the operations a) and b). If the full power transmission is not supported by the UE, the base station may indicate only the operation b) to the UE. Through the reporting procedure, the base station may simply perform "2T4R" related SRS configuration (accompanied with the full power enabler), and an operation that is left to a degree of UE freedom may be possible in a state where the base station does not know whether the UE performs transmission of (1,2)→(3,4) or transmission of (1,3)→(2,4) (i.e., a situation of mapping a specific panel for each antenna port for sounding).

For the operation by the enabler, it may not be necessary to link the P-ID for each SRS resource set/SRS resource.

The operation by the enabler can be utilized when UE implementation has been made so that max power for each panel is less than UE UL max power, or when transmission is controlled in such a way. On the other hand, when UE implementation has been made so that a specific panel can achieve the UE UL max power (which can be seen when default/main Tx/Rx panel exists), the base station may perform explicit switching/configuration/update/control of the operations a) and b).

After the UE transmits SRS resource set(s) by the explicit control of the operations a) and b) or/and the operations a) and b) by the enabler, the base station may schedule, to the UE, a PDSCH across a single Rx panel or Rx multi-panel through reciprocity based DL CSI measurement.

The UE performs transmission for one or multiple SRS resource set(s) based on the base station configuration/indication as in the proposal 6 after the UE capability reporting as in the proposal 5. It is obvious that the proposals 5 and 6 are also applicable to the UE having 4 or less Rx (Tx) antennas, and that SRS antenna switching configuration utilizing 4 or less Rx (Tx) antenna(s) is applicable to the UE having more than 4 Rx (Tx) antennas.

From a perspective of UE/BS operation, one of the above-described proposals/methods can be independently applied to the UE/BS operation, or combinations of two or more proposals/methods of the above-described proposals/methods can be applied to the UE/BS operation.

AN SRS antenna switching method considering FR4 or/and multi-panel UE is described below.

SRS antenna switching: in Rel-15 NR MIMO, it has been decided that SRS transmission for antenna switching for efficiently acquiring DL CSI is supported for a UE in which the number of Tx antennas (chains) is less than the number of Rx antennas (chains). A UE supporting antenna switching may report, to a base station, one of {"1T2R", "1T4R", "2T4R", "1T4R/2T4R", "T=R"} as a capability, and the base station may configure an SRS resource set and SRS resources for antenna switching corresponding to the capability and indicate a transmission.

The characteristic part here is that when the base station indicates SRS antenna switching via an aperiodic SRS, the UE can finish the antenna switching within one slot through a single SRS resource set in all of other configurations, but in 1T4R configuration, it may be configured so that the UE finishes the antenna switching in two different slots using combinations of 1 port+3 port or 2 port+2 port or 3 port+1 port, etc. through different two SRS resource sets. In the 1T4R SRS antenna switching, since 4 symbols are required only for the SRS symbol, and 3 symbols are required for a gap symbol for protecting an RF switching time between each switching, it exceeds 6 symbols that are the max number of configurable SRS symbols within a slot of Rel-15 NR.

In Rel-16 NR standard, a new UE capability for the antenna switching has been defined.

In Rel-17 NR standard, discussion on SRS antenna switching for more than 4 Rx antennas is scheduled to proceed. (xTyR configuration, e.g., x={1, 2, 4}, y={6, 8})

FR4: In the 3GPP RAN1 standard, support for NR operation in FR4 (e.g., 52.6 to 71 GHz band) which is a higher frequency band, in addition to FR1 and FR2 which are operating frequency ranges of the current NR system, is under consideration. In FR4, it is expected that higher capacity data communication is possible through a wider band, but analog beam based communication using a large number of Tx/Rx antennas is essential because an attenuation rate of received power according to a radio distance is greater than that of FR2. Further, while a subcarrier spacing (SCS) up to 120 kHz is supported in FR2, a subcarrier spacing of 240 kHz or more is supported in FR4. If SRS antenna switching for UL/DL reciprocity based DL CSI acquisition is introduced in FR4, a symbol duration becomes shorter when considering the SCS of FR4. In this case, as in Table 10 above (the symbol "Y" representing the guard period), the number of gap symbols between antenna switching SRS symbols varying depending on the SCS may exceed 2. That is, 3 or more gap symbols may be necessary. As above, if the number of gap symbols configured to protect a transient period by RF switching between SRS antenna switching exceeds 2, the following problems may occur. Specifically, in a specific antenna switching configuration based on the number of available SRS symbols within a slot of a specific UE, a problem may occur in which the UE cannot finish antenna switching within one or two slot(s).

In addition, as the number of Tx/Rx antennas increases, the need for explicit/implicit identification for Tx/Rx panel of the UE is emerging. When information on the Tx/Rx panel of the UE is shared between the base station and the UE, if the concept of panel is introduced even in the SRS antenna switching operation, additional issues, such as a panel switching time in addition to an antenna switching time, that need to be considered may arise.

Based on such a background, an SRS antenna switching method considering FR4 or/and multi-panel UE is described below.

[Proposal 7]

A base station may configure/indicate so that different SRS resource (sets) representing different Rx (/Tx) antenna ports of a UE are located in the same or different slot(s), so as to increase scheduling flexibility of an SRS resource (set) for SRS antenna switching configuration/indication.

For example, an SRS configuration for a specific SRS antenna switching configuration (e.g., 1T2R, 1T4R, 2T4R, nTnR, 1T6R, 1T8R, 2T6R, 2T8R, 4T6R, 4T8R, etc.) may consist of a plurality of SRS resource sets or/and SRS resources. The SRS resource sets or/and the SRS resources may mean different Rx (/Tx) antenna ports for SRS antenna switching of the UE. Proposal 7-1 and Proposal 7-2 are described in detail below.

[Proposal 7-1]

If a time domain behavior of the SRS resource (set) is a periodic or semi-persistent property The base station may configure/activate different periodicityAndOffset values for a plurality of SRS resource (sets) with periodic/semi-persistent property for a specific SRS antenna switching configuration. For accurate DL CSI acquisition, the plurality of SRS resource (sets) may be configured/prescribed to be located in contiguous (valid) UL slots.

More specifically, if the SRS resources represent different Rx (/Tx) antenna ports of the UE (i.e., if transmission based on each SRS resource is related to different Rx (/Tx) antenna ports), the respective SRS resources by periodicity or/and offset configured as above may be located in i) the same slot or ii) different contiguous (valid) UL slots. The respective SRS resources within the slot(s) based on the i) or ii) may be configured not to be located in the same symbol considering an antenna switching guard period (gap symbol). Each SRS resource within the slot(s) may be configured not to overlap the guard period (guard symbols). In other words, the guard period included in the slot(s) may be configured between the SRS resources not to overlap the SRS resource. Each SRS resource may be configured with a different number of ports.

For another example, if an SRS resource set represents different Rx (/Tx) antenna ports of the UE (i.e., if transmission based on each SRS resource set is related to different Rx (/Tx) antenna ports), each SRS resource set may have one or multiple SRS resource(s), and the respective SRS resource sets by periodicity or/and offset configured in the corresponding SRS resource may be located in i) the same slot or ii) different contiguous (valid) UL slots. That is, scheduling in the same slot of SRS resource sets for a specific antenna switching configuration may be allowed. The respective SRS resource sets within the slot(s) based on the i) or ii) may be configured not to be located in the same symbol (i.e., not to overlap in a time domain) considering an antenna switching guard period (gap symbol). Each SRS resource set within the slot(s) may be configured not to overlap the guard period (guard symbols). In other words, the guard period included in the slot(s) may be configured between the SRS resource sets not to overlap the SRS resource set. In the same manner as the above example, SRS resources in each SRS resource set may be configured with a different number of ports. (That is, each SRS resource set may have a different number of ports.)

In particular, in the above examples, from a usage perspective of UL (slot) resource of the UE, SRS resource set(s) or/and SRS resource(s) for a single SRS antenna switching configuration may have different periodicity values (in periodicityAndOffset) so as to increase flexibility. For example, if the SRS resources are configured for 1T4R antenna switching purpose of index 0 to index 3, index 0 and index 1 may have periodicity (periodicity in time domain) value T, and index 2 and index 3 may have n*T value or 1/n*T value, where n is a non-negative integer). i) the indices 0 and 1 and the offset value (in periodicityAndOffset) and ii) the offset values of the indices 2, 3 may be the same as or different from each other. In this case, the UE may be configured to map and transmit a default antenna port/main antenna port or an antenna port with a good power amplifier (PA) performance to index 0 and index 1, which are transmitted more frequently, in periodicity, and map and transmit remaining ports to index 2 and index 3. The effect of this is described as follows.

The base station enables strong DL scheduling by measuring more frequently reciprocity based DL channel for 2 ports of good quality. If the base station performs DL channel measurement based on index 2 (or index 3) with n times the periodicity of index 0 (or index 1), when there is a need to temporarily increase a DL throughput by estimating DL channel of all antenna ports of index 0 to index 3, the base station may schedule DL data of 3 ranks or higher to the UE. Since the base station does not sound all ports in all periodicities (e.g., periodicity based on indices 0 to 3), efficient utilization of UL resources becomes possible from a perspective in which UL time-domain resources that could have been used for sounding in some periodicities can be utilized for other UL channel/RS (e.g., PUSCH, PUCCH, etc.). In addition, there is an effect of enabling the partial antenna switching (antenna switching across subset of antennas) in some periodicities by differentially configuring n-times or 1/n-times periodicity to SRS resources within the same configuration. If periodicity is differently configured for each SRS resource (e.g., index 0 is T, index 1 is 2T, index 2 is 4T, and index 3 is 8T) as above, the partial antenna switching may be performed as follows. For example, in a second periodicity (2T) based on the T value is transmitted, only SRS resources based on index 0/index 1 among SRS resources according to indices 0 to 3 are transmitted. Thus, antenna switching based on some antenna ports of all the antenna ports is achieved.

[Proposal 7-2]

If a time domain behavior of the SRS resource (set) is an aperiodic property

The base station may configure/activate different slotOffset values for a plurality of SRS resource sets with an aperiodic property for a specific SRS antenna switching configuration. For accurate DL CSI acquisition, the plurality of SRS resource (sets) may be configured/prescribed to be located in contiguous (valid) UL slots.

More specifically, if the SRS resources represent different Rx (/Tx) antenna ports of the UE (i.e., if transmission based on each SRS resource is related to different Rx (/Tx) antenna ports), the respective SRS resources by slotOffset configured in the SRS resource set, to which the corresponding SRS resources belong as above, may be located in i) the same slot or ii) different contiguous (valid) UL slots. That is, scheduling in the same slot of SRS resource sets for a specific antenna switching configuration may be allowed. The respective SRS resources within the slot(s) based on the i) or ii) may be configured not to be located in the same symbol considering an antenna switching guard period (gap symbol). Each SRS resource within the slot(s) may be configured not to overlap the guard period (guard symbols). In other words, the guard period included in the slot(s) may be configured between the SRS resources not to overlap the SRS resource. The SRS resource may be configured with a different number of ports.

For another example, if an SRS resource set represents different Rx (/Tx) antenna ports of the UE (i.e., if transmission based on each SRS resource set is related to different Rx (/Tx) antenna ports), each SRS resource set may have one or multiple SRS resource(s), and the respective SRS resource sets by slotOffset configured in the SRS resource set to which the corresponding SRS resources belong may be located in i) the same slot or ii) different contiguous (valid) UL slots. (That is, scheduling in the same slot of SRS resource sets for a specific antenna switching configuration may be allowed.) The respective SRS resource sets within the slot(s) based on the i) or ii) may be configured not to be located in the same symbol (i.e., not to overlap in a time domain) considering an antenna switching guard period (gap symbol). Each SRS resource set within the slot(s) may be configured not to overlap the guard period (guard symbols). In other words, the guard period included in the slot(s) may be configured between the SRS resource sets not to overlap the SRS resource set. In the same manner as the above example, SRS resources in each SRS resource set may be configured with a different number of ports. (That is, each SRS resource set may have a different number of ports.)

A range of a slot in which SRS resource (sets) for the single SRS antenna switching configuration can be located may be configured as follows. The range of the slot may be determined based on at least one of i) contiguous (valid) UL slot(s) or ii) a specific number of slots (e.g., k slots). The range of the slot (e.g., consecutive UL slots/threshold value (k)) may be separately configured/activated by the base station. Hence, the SRS resource (sets) triggered beyond the range of the slot, in which the SRS resource (sets) can be located by TDD UL/DL configuration, etc. may be configured to drop by the UE. For example, when TDD configuration is the same as DDUUDDU (e.g., slot #1 to slot #7), if the base station triggers 2-slot SRS resource(s) and/or SRS resource set(s) including 4 ports for a first UL slot (slot #3) and a second UL slot (slot #4), the UE may transmit all of SRS port {0, 1, 2, 3}. However, if the base station triggers the 2-slot SRS resource set for the second UL slot (slot #4) and a third UL slot (slot #7) (since a time interval is too wide), the UE may be configured/prescribed so that the second UL slot (i.e., the slot located at the back among 2 slots) among the second UL slot (slot #4) and the third UL slot (slot #7) does not send SRS (i.e., the UE performs partial antenna switching). Alternatively, in the above example, the UE may be configured/prescribed to unconditionally transmit a reference SRS port (e.g., default port or port 0) once and then send port {2,3}, in order to eliminate the time-varying effect of the channel in the second UL slot among the second UL slot and the third UL slot (since a time interval is too wide). For the above operation, configuration/activation for at least one of the following 1) or 2) may be achieved by the base station (via RRC/MAC CE).

1) a threshold of a time interval for a slot range in which the SRS resource (sets) can be located (e.g., the threshold)
2) information indicating the UE to perform any one operation (among the above-described operations) when triggering exceeding the threshold has been indicated In addition, the threshold may be configured/prescribed as a value dependent on a subcarrier spacing (SCS) (e.g., within 2 slots at 15/30 kHz SCS, within 4 slots at SCS of 240 kHz or more, etc.).

Based on the proposals 7-1 and 7-2, the base station may flexibly schedule a specific SRS antenna switching configuration for one or multiple slots.

If 1T4R configuration is taken as an example, due to an increase in SCS in FR4, a symbol duration is reduced, so more than 4 gap symbols may be required between antenna switching (i.e., the time required for antenna switching may be greater than 4 symbols according to the symbol duration of FR4). In this case, even if all of the maximum number of SRS symbols within the slot of Rel-15 NR are used, only sounding for only one Rx (Tx) antenna port(s) in the slot may performed (i.e., if the maximum number of symbols in a slot is 6, and there are one SRS symbol+five gap symbols, sounding is not possible within the slot for two or more ports). In this case, in order to perform all of 1T4R antenna switching in FR4, four UL slots may be required, and sounding of four Rx (Tx) antenna port(s) may be scheduled to the four slots based on the proposals 7-1 and 7-2.

For another example, based on the proposals 7-1 and 7-2, in FR4 for 1T4R configuration, even if there are 4 or less gap symbols between antenna switching, flexible SRS antenna switching scheduling using 2 to 4 slots is possible. For example, a distribution such as 1 port+3 port, 2 port+2 port, and 3 port+1 port is possible in two slots, a distribution such as 1 port+1 port+2 port, 1 port+2 port+1 port, and 2 port+1 port+1 port is possible in three slots, and a distribution such as 1 port+1 port+1 port+1 port is possible in four slots.

In addition, as in the above examples, if the number of gap symbols between antenna switching increases, unnecessary gap symbols may increase in order to finish SRS antenna switching within the slot, and utilization of symbol resources within the slot may decrease. Therefore, this example enables coexistence of the SRS and other uplink channels/reference signals (UL channels/RSs) within the slot through full flexible SRS resource (set) scheduling, thereby having an advantage in terms of resource utilization.

[Proposal 8]

(In addition to the proposal 7) in order to increase scheduling flexibility of an SRS resource (set) for SRS antenna switching configuration/indication, when a different SRS resource (set) represents a different Rx (/Tx) panel of a UE, a base station may configure/indicate so that the plurality of SRS resource (sets) is located in discontinuous (non-contiguous) (valid) UL slots considering a panel switching time (by UE capability reporting).

According to the proposal 7, in case of an antenna switching operation within a specific panel, for the purpose of a reduction in a delay and a more accurate full channel combination from a base station perspective, it is restricted to finish antenna switching in a contiguous (valid) UL slot. On the other hand, in the proposal 8, in case of an antenna switching combination between panels, SRS resource (set)(s) corresponding to each panel may be scheduled to slots, that are spaced apart from each other in a time domain, considering a panel switching delay.

Based on the proposal 8, there is an advantage in that the base station can configure/activate/indicate a single SRS antenna switching configuration to the UE and acquire DL CSI information in a cross-panel to perform a panel-specific DL scheduling.

Based on the proposals 7 and 8, the present disclosure proposes an operation for transmission-configuring (RRC)/activating (MAC CE)/indicating (DCI) all of SRS resource set(s) for a single SRS antenna switching configuration at once. That is, it may be configured to transmit a plurality of periodic SRS resource sets for a single SRS antenna switching configuration via RRC configuration, to include activation information for a plurality of SRS resource sets in a single MAC CE message, and to construct a plurality of SRS resource sets connected/configured/activated to a specific codepoint of an SRS request field of DL/UL DCI.

From an implementation perspective, operations (e.g., operations related to transmission of an SRS based on at least one of the proposals 1 to 8) of a base station/UE according to the above-described embodiments may be processed by a device (e.g., processors 102 and 202 of FIG. 16) of FIGS. 15 to 19 to be described later.

The operations (e.g., operations related to transmission of the SRS based on at least one of the proposals 1 to 8) of the base station/UE according to the above-described embodiments may be stored in a memory (e.g., memories 104 and 204 of FIG. 16) in the form of commands/programs (e.g., instructions, executable codes) for running at least one processor (e.g., processors 102 and 202 of FIG. 16).

Hereinafter, the above-described embodiments are described from an operation perspective of a UE/base station with reference to FIGS. 11 and 12.

FIG. 11 is a flowchart illustrating an operation of a UE to which a method described in the present disclosure is applicable. FIG. 11 is merely for convenience of description and does not limit the scope of the present disclosure.

Referring to FIG. 11, it is assumed that a UE performs an uplink transmission (e.g., UL channel, additional SRS, etc.) based on the above-described embodiments.

The UE may report, to a base station (BS), a panel related UE capability (e.g., panel based SRS transmission/panel switching related UE capability/antenna switching related capability, etc.), in S1110. For example, the UE may perform a UE capability reporting as in step 0) of the above-described method, and this may be performed via higher layer signaling, etc. For another example, the UE may report, to the base station, capability information (e.g., xTyR) related to an SRS transmission for antenna switching purpose based on the above-described proposal 5.

The UE may receive an SRS configuration from the BS, in S1120. For example, the UE may receive the SRS configuration including information related to SRS (e.g., SRS-config) transmission as in step 1) of the above-described method. In this case, the SRS configuration may be transmitted via higher layer signaling, etc. For another example, the UE may receive, from the BS, the SRS configuration including information related to configuration of an SRS resource set/SRS resource for antenna switching purpose.

For example, the SRS configuration may include an SRS resource (set) configuration for SRS antenna switching (in a band according to FR4) based on the proposal 7. Specifically, the SRS resource (set) may be configured as follows based on the SRS configuration. The SRS resource (set) related to the same or different Rx (/Tx) antenna port(s) may be configured to be located in the same slot or different slot(s). The different slot(s) may be based on continuous (valid) UL slots. The number of slots related to the continuous (valid) UL slots may be based on the above-described threshold (e.g., k). The location of the SRS resource (set) may be based on a time domain behavior (e.g., periodic/aperiodic/semi-persistent) related to the SRS resource (set). For example, based on the proposal 7-1, different periodicity/offset (e.g., periodicityAndOffset) may be configured to SRS resource (set)(s) based on the periodic/semi-persistent behavior. Further, based on the proposal 7-2, a slot offset (e.g., slotOffset) may be configured to SRS resource (set)(s) based on the aperiodic behavior. In addition, considering a symbol duration and an antenna switching delay of FR 4, remaining symbols (e.g., 5 symbols) except for SRS symbol(s) (e.g., 1 symbol) within one slot (e.g., 6 symbols) may be configured as a gap symbol (guard symbol).

For example, the SRS configuration may include an SRS resource (set) configuration for SRS antenna switching (additionally considering a panel switching time) based on the proposal 8. Specifically, the SRS resource (set) may be configured as follows based on the SRS configuration. The SRS resource (set) related to the same or different Rx (/Tx) antenna port(s) may be configured to be located in different slot(s). The different slot(s) may be based on discontinuous (valid) UL slots. An interval between each slot of the discontinuous (valid) UL slots may be related to a panel switching delay of the UE.

The UE may receive DCI related to transmission such as an SRS and/or UL channel, in S1130. However, the corresponding step may be replaced with RRC configuration/MAC CE as mentioned in step 2) of the above-described method.

Afterwards, the UE may transmit the SRS and/or the UL channel(s) based on the received SRS configuration, DCI, and/or a predefined rule (e.g., priority rule, etc.), in S1140. For example, in multi symbol SRS transmission, the UE may transmit the SRS and/or the UL channel(s) based on the rule, etc. described in the above-described method (e.g., specifically, the proposals 2, 3 and 4). For another example, the UE may transmit the SRS based on the proposal 6.

The above-described operation of the UE may be implemented by using the devices described in FIGS. 15 to 19, and some of entities may be omitted. For example, referring to FIG. 16, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

FIG. 12 is a flowchart illustrating an operation of a BS to which a method proposed in the present disclosure is applicable. FIG. 12 is merely for convenience of description and does not limit the scope of the present disclosure.

Referring to FIG. 12, it is assumed that a base station (BS) receives an uplink transmission (e.g., UL channel, additional SRS, etc.) based on the above-described embodiments.

The BS may receive, from a UE, a reporting for a panel related UE capability (e.g., panel based SRS transmission/panel switching related UE capability/antenna switching related capability, etc.), in S1210. For example, the BS may receive a UE capability reporting as in step 0) of the above-described method, and this may be performed via higher layer signaling, etc. For another example, the BS may receive, from the UE, capability information (e.g., xTyR) related to an SRS transmission for antenna switching purpose based on the above-described proposal 5.

The BS may transmit an SRS configuration to the UE, in S1220. For example, the BS may transmit, to the UE, the SRS configuration including information related to SRS (e.g., SRS-config) transmission as in step 1) of the above-described method. In this case, the SRS configuration may be transmitted via higher layer signaling, etc. For another example, the BS may transmit, to the UE, the SRS configuration including information related to configuration of an SRS resource set/SRS resource for antenna switching purpose.

For example, the SRS configuration may include an SRS resource (set) configuration for SRS antenna switching (in a band according to FR4) based on the proposal 7. Specifically, the SRS resource (set) may be configured as follows based on the SRS configuration. The SRS resource (set) related to the same or different Rx (/Tx) antenna port(s) may be configured to be located in the same slot or different slot(s). The different slot(s) may be based on continuous (valid) UL slots. The number of slots related to the continuous (valid) UL slots may be based on the above-described threshold (e.g., k). The location of the SRS resource (set) may be based on a time domain behavior (e.g., periodic/aperiodic/semi-persistent) related to the SRS resource (set). For example, based on the proposal 7-1, different periodicity/offset (e.g., periodicityAndOffset) may be configured to SRS resource (set)(s) based on the periodic/semi-persistent behavior. Further, based on the proposal 7-2, a slot offset (e.g., slotOffset) may be configured to SRS resource (set)(s) based on the aperiodic behavior. In addition, considering a symbol duration and an antenna switching delay of FR 4, remaining symbols (e.g., 5 symbols) except for SRS symbol (s) (e.g., 1 symbol) within one slot (e.g., 6 symbols) may be configured as a gap symbol (guard symbol).

For example, the SRS configuration may include an SRS resource (set) configuration for SRS antenna switching (additionally considering a panel switching time) based on the proposal 8. Specifically, the SRS resource (set) may be configured as follows based on the SRS configuration. The SRS resource (set) related to the same or different Rx (/Tx) antenna port(s) may be configured to be located in different slot(s). The different slot(s) may be based on discontinuous (valid) UL slots. An interval between each slot of the discontinuous (valid) UL slots may be related to a panel switching delay of the UE.

The BS may transmit, to the UE, DCI related to transmission such as an SRS and/or UL channel, in S1230. However, the corresponding step may be replaced with RRC configuration/MAC CE as mentioned in step 2) of the above-described method.

Afterwards, the BS may receive, from the UE, the SRS and/or the UL channel(s) transmitted based on the configured/indicated SRS configuration, DCI, and/or a predefined rule (e.g., priority rule, etc.), in S1240. For example, in multi symbol SRS transmission, the UE may be configured to transmit the SRS and/or the UL channel(s) based on the rule, etc. described in the above-described method (e.g., specifically, the proposals 2, 3 and 4). For another example, the UE may transmit the SRS based on the proposal 6.

The above-described operation of the BS may be implemented by using the devices described in FIGS. 15 to 19, and some of the entities may be omitted. For example, referring to FIG. 16, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

The SRS transmission method of the UE to which the above-described embodiments are applied will be described in detail with reference to FIG. 13.

FIG. 13 is a flowchart illustrating a method of transmitting, by a UE, a sounding reference signal in a wireless communication system according to an embodiment of the present disclosure.

Referring to FIG. 13, a method of transmitting, by a UE, a sounding reference signal (SRS) in a wireless communication system according to an embodiment of the present disclosure comprises a step S1310 of receiving SRS configuration information and a step S1320 of transmitting an SRS.

In S1310, the UE receives, from a base station, configuration information related to a sounding reference signal (SRS).

According to an embodiment, the configuration information may include information related to antenna switching. The configuration information may be based on the proposal 7.

According to an embodiment, a plurality of SRS resource sets may be configured based on the configuration information. Each of the plurality of SRS resource sets may include at least one SRS resource. That is, one SRS resource set may consist of at least one SRS resource.

According to an embodiment, based on the plurality of SRS resource sets being configured to one or more slots, each of the plurality of SRS resource sets may be configured not to overlap a guard period for the antenna switching in the one or more slots.

The present embodiment may be based on the proposal 7. Specifically, a resource for SRS antenna switching including the guard period may be configured as follows. The guard period (e.g., guard symbol(s) or gap symbol(s)) included in the one or more slots may be configured between the SRS resource sets not to overlap the SRS resource set.

According to an embodiment, the one or more slots may be based on a plurality of slots. The plurality of slots may be based on consecutive UL slots. The present embodiment may be based on the proposal 7.

According to an embodiment, based on a time domain behavior related to transmission of the SRS being aperiodic, and all or some of the one or more slots being out of a preset range, the following operation may be performed. A transmission of an SRS based on an SRS resource set that is triggered beyond the preset range among the plurality of SRS resource sets may be dropped. The present embodiment may be based on the proposal 7-2.

The preset range may be determined based on at least one of consecutive UL slots or a preset number (e.g., threshold K) of UL slots. For example, the preset range may be based on the consecutive UL slots. For another example, the preset range may be based on K UL slots. For another example, the preset range may be based on K consecutive UL slots.

According to an embodiment, based on the time domain behavior related to transmission of the SRS being periodic or semi-persistent, a periodicity related to the plurality of SRS resource sets may be based on two or more different periodicities. The present embodiment may be based on the proposal 7-1. A specific example will be described below.

#Two SRS resource sets (set 1 and set 2) for SRS antenna switching (e.g., 1T4R) based on four antenna ports (indices 0 to 3) are configured

#Antenna ports related to the set 1 are indices 0 and 1

#Antenna ports related to the set 2 are indices 2 and 3

In this instance, a periodicity related to the set 1 and the set 2 may be based on two or more different periodicities. Specifically, a periodicity related to the set 1 may be T, and a periodicity related to the set 2 may be n*T (e.g., 2T, 3T, . . . ). The following effects are derived from the present embodiment.

Transmission of the SRS based on an antenna port (e.g., indices 0 and 1) with better quality may be performed more frequently in comparison with other antenna ports to acquire DL CSI. Reliability of signaling related to DL scheduling can be improved based on DL CSI.

Since the base station does not sound all the ports in every periodicity (e.g., T), a resource (i.e., UL time-domain resource) that could have been used for sounding in some periodicities may be used for other UL channels/RSs (e.g., PUSCH, PUCCH, etc.). Therefore, efficient utilization of UL resources is possible.

According to an embodiment, a periodicity having the shortest length among two or more different periodicities may be related to one or more specific antenna ports among a plurality of antenna ports. The one or more specific antenna ports may be based on the proposal 7-1. The one or more specific antenna ports may be based on at least one of a default antenna port, a main antenna port, or an antenna port with the best performance of a power amplifier (PA). For example, the default antenna may be defined as an antenna port with the best performance of the PA.

According to an embodiment, based on the antenna switching being performed based on a plurality of panels, the plurality of slots may be based on discontinuous uplink slots. The present embodiment may be based on the proposal 8. The discontinuous uplink slots may mean uplink slots based on the following i) or ii).

i) If the uplink slots each have a time interval and are disposed to be spaced apart from each other (e.g., UL slot 1–(time interval 1)–UL slot 2–(time interval 2)–UL slot 3)

ii) If any one of the uplink slots is not contiguous with other slots (e.g., UL slot 1 (slot index 0)–UL slot 2 (slot index 1)–((time interval 1)–UL slot 3 (slot index 6))

The time intervals between the discontinuous uplink slots may include a time interval based on a panel switching delay. In the above example, i) after SRS transmission based on the UL slots 1 and 2 is performed, if the panel needs to be changed for the antenna switching, a length of the time interval 2 may be determined based on the panel switching delay. For example, the length of the time interval 2 may be configured to be greater than or equal to the panel switching delay.

According to the above-described step S1310, an operation of the UE (100/200 of FIGS. 15 to 19) to receive the configuration information related to the sounding reference signal (SRS) from the base station (100/200 of FIGS. 15 to 19) may be implemented by a device of FIGS. 15 to 19. For example, referring to FIG. 16, one or more processors 102 may control one or more transceivers 106 and/or one or more memories 104 so as to receive the configuration information related to the SRS from the base station 200.

In S1320, the UE transmits the SRS to the base station based on the configuration information.

According to an embodiment, the SRS may be transmitted based on a plurality of SRS resource sets. The plurality of SRS resource sets may be related to a plurality of antenna ports.

According to an embodiment, the method may further comprise a step of receiving DCI. Specifically, the UE may receive, from the base station, downlink control information (DCI) triggering transmission of the SRS. In this instance, a time domain behavior of the SRS may be aperiodic. The UE may transmit the SRS to the base station based on the configuration information and the DCI.

According to the above-described step S1320, an operation of the UE (100/200 of FIGS. 15 to 19) to transmit the SRS to the base station (100/200 of FIGS. 15 to 19) based on the configuration information may be implemented by the device of FIGS. 15 to 19. For example, referring to FIG. 16, one or more processors 102 may control one or more transceivers 106 and/or one or more memories 104 so as to transmit the SRS to the base station 200 based on the configuration information.

An SRS receiving method of the base station, to which the above-described embodiments are applied, is described in detail below with reference to FIG. 14.

FIG. 14 is a flowchart illustrating a method of receiving, by a BS, a sounding reference signal in a wireless communication system according to another embodiment of the present disclosure.

Referring to FIG. 14, a method of receiving, by a base station, a sounding reference signal in a wireless communication system according to another embodiment of the present disclosure comprises a step S1410 of transmitting SRS configuration information and a step S1420 of receiving an SRS.

In S1410, the base station transmits, to a UE, configuration information related to a sounding reference signal (SRS).

According to an embodiment, the configuration information may include information related to antenna switching. The configuration information may be based on the proposal 7.

According to an embodiment, a plurality of SRS resource sets may be configured based on the configuration information. Each of the plurality of SRS resource sets may include at least one SRS resource. That is, one SRS resource set may consist of at least one SRS resource.

According to an embodiment, based on the plurality of SRS resource sets being configured to one or more slots, each of the plurality of SRS resource sets may be configured not to overlap a guard period for the antenna switching in the one or more slots.

The present embodiment may be based on the proposal 7. Specifically, a resource for SRS antenna switching including the guard period may be configured as follows. The guard period (e.g., guard symbol(s) or gap symbol(s)) included in the one or more slots may be configured between the SRS resource sets not to overlap the SRS resource set.

According to an embodiment, the one or more slots may be based on a plurality of slots. The plurality of slots may be based on consecutive UL slots. The present embodiment may be based on the proposal 7.

According to an embodiment, based on a time domain behavior related to transmission of the SRS being aperiodic, and all or some of the one or more slots being out of a preset range, the following operation may be configured to be performed by the UE. A transmission of an SRS based on an SRS resource set that is triggered beyond the preset range among the plurality of SRS resource sets may be dropped. The present embodiment may be based on the proposal 7-2.

The preset range may be determined based on at least one of consecutive UL slots or a preset number (e.g., threshold K) of UL slots. For example, the preset range may be based on the consecutive UL slots. For another example, the preset range may be based on K UL slots. For another example, the preset range may be based on K consecutive UL slots.

According to an embodiment, based on the time domain behavior related to transmission of the SRS being periodic or semi-persistent, a periodicity related to the plurality of SRS resource sets may be based on two different periodicities. The present embodiment may be based on the proposal 7-1. A specific example will be described below.

#Two SRS resource sets (set 1 and set 2) for SRS antenna switching (e.g., 1T4R) based on four antenna ports (indices 0 to 3) are configured

#Antenna ports related to the set 1 are indices 0 and 1

#Antenna ports related to the set 2 are indices 2 and 3

In this instance, a periodicity related to the set 1 and the set 2 may be based on two or more different periodicities. Specifically, a periodicity related to the set 1 may be T, and a periodicity related to the set 2 may be n*T (e.g., 2T, 3T, . . . ). The following effects are derived from the present embodiment.

Transmission of the SRS based on an antenna port (e.g., indices 0 and 1) with better quality may be performed more frequently in comparison with other antenna ports to acquire DL CSI. Reliability of signaling related to DL scheduling can be improved based on DL CSI.

Since the base station does not sound all the ports in every periodicity (e.g., T), a resource (i.e., UL time-domain resource) that could have been used for sounding in some periodicities may be used for other UL channels/RSs (e.g., PUSCH, PUCCH, etc.). Therefore, efficient utilization of UL resources is possible.

According to an embodiment, a periodicity having the shortest length among two or more different periodicities may be related to one or more specific antenna ports among a plurality of antenna ports. The one or more specific antenna ports may be based on the proposal 7-1. The one or more specific antenna ports may be based on at least one of a default antenna port, a main antenna port, or an antenna port with the best performance of a power amplifier (PA). For example, the default antenna may be defined as an antenna port with the best performance of the PA.

According to an embodiment, based on the antenna switching being performed based on a plurality of panels, the plurality of slots may be based on discontinuous uplink slots. The present embodiment may be based on the proposal 8. The discontinuous uplink slots may mean uplink slots based on the following i) or ii).

i) If the uplink slots each have a time interval and are disposed to be spaced apart from each other (e.g., UL slot 1-(time interval 1)-UL slot 2-(time interval 2)-UL slot 3)

ii) If any one of the uplink slots is not contiguous with other slots (e.g., UL slot 1 (slot index 0)-UL slot 2 (slot index 1)-((time interval 1)-UL slot 3 (slot index 6))

The time intervals between the discontinuous uplink slots may include a time interval based on a panel switching delay. In the above example, i) after SRS transmission based on the UL slots 1 and 2 is performed, if the panel needs to be changed for the antenna switching, a length of the time interval 2 may be determined based on the panel switching delay. For example, the length of the time interval 2 may be configured to be greater than or equal to the panel switching delay.

According to the above-described step S1410, an operation of the base station (100/200 of FIGS. 15 to 19) to transmit the configuration information related to the sounding reference signal (SRS) to the UE (100/200 of FIGS. 15 to 19) may be implemented by a device of FIGS. 15 to 19. For example, referring to FIG. 16, one or more processors 102 may control one or more transceivers 106 and/or one or more memories 104 so as to transmit the configuration information related to the SRS to the UE 100.

In S1420, the base station receives the SRS from the UE based on the configuration information.

According to an embodiment, the SRS may be transmitted based on a plurality of SRS resource sets. The plurality of SRS resource sets may be related to a plurality of antenna ports.

According to an embodiment, the method may further comprise a step of transmitting DCI. Specifically, the base station may transmit, to the UE, downlink control information (DCI) triggering transmission of the SRS. In this instance, a time domain behavior of the SRS may be aperiodic. The SRS may be transmitted based on the configuration information and the DCI.

According to the above-described step S1420, an operation of the base station (100/200 of FIGS. 15 to 19) to receive the SRS from the UE (100/200 of FIGS. 15 to 19) based on the configuration information may be implemented by the device of FIGS. 15 to 19. For example, referring to FIG. 16, one or more processors 102 may control one or more transceivers 106 and/or one or more memories 104 so as to receive the SRS from the UE 100 based on the configuration information.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 18 illustrates another example of a wireless device applied to the present disclosure.

The wireless device may be implemented in various forms according to a use-case/service (refer to FIG. 15). Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 19 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a user equipment (UE), the method comprising:

receiving configuration information that includes information for one or more sounding reference signal (SRS) resource sets; and transmitting an SRS based on the configuration information, wherein usage of one or more SRS resource sets is configured as an antenna switching, wherein each of the one or more SRS resource sets is related to a different antenna port, wherein, based on two SRS resource sets being located in two slots, a guard period for the antenna switching exists between a first SRS resource set in a first slot and a second SRS resource set in a second slot, wherein, based on the two SRS resource sets being aperiodic SRS resource sets, the two SRS resource sets are configured with a same trigger value and different slot offset values, wherein a slot-range threshold is based on a subcarrier spacing, and wherein, based on an SRS trigger for the two SRS resource sets exceeding the slot-range threshold, the UE drops a transmission of the second SRS resource set in the second slot.

2. The method of claim 1, wherein the two slots are based on two consecutive slots, wherein the a guard period for the antenna switching exists between i) a last symbol occupied by the first SRS resource set in the first slot and ii) a first symbol occupied by the second SRS resource set in the second slot.

3. The method of claim 2, wherein, based on a time domain behavior related to a transmission of the SRS being aperiodic, and all or some of the two slots being out of a preset range, a transmission of an SRS based on an SRS resource set that is triggered beyond the preset range among the one or more SRS resource sets is dropped, wherein the preset range is determined based on at least one of consecutive UL slots or a preset number of UL slots.

4. The method of claim 1, wherein, based on a time domain behavior related to a transmission of the SRS being periodic or semi-persistent, a periodicity related to the one or more SRS resource sets is based on two or more different periodicities.

5. The method of claim 4, wherein a periodicity having a shortest length among the two or more different periodicities is related to one or more specific antenna ports among a plurality of antenna ports.

6. The method of claim 1, wherein based on the antenna switching being performed based on a plurality of panels, the two slots are based on discontinuous uplink slots, and wherein time intervals between the discontinuous uplink slots include a time interval based on a panel switching delay.

7. The method of claim 1, further comprising:

receiving downlink control information (DCI) triggering a transmission of the SRS.

8. A user equipment (UE) comprising:

one or more transceivers;

one or more processors; and one or more memories operably connected to the one or more processors, the one or more memories storing instructions that are configured so that the one or more processors perform operations based on the one or more memories being executed by the one or more processors, wherein the operations comprise:

receiving configuration information that includes information for a plurality of one or more sounding reference signal (SRS) resource sets; and transmitting an SRS based on the configuration information, wherein usage of the one or more SRS resource sets is configured as an antenna switching, wherein each of the one or more SRS resource sets is related to a different antenna port, wherein, based on two SRS resource sets being located in two slots, a guard period for the antenna switching exists between a first SRS resource set in a first slot and a second SRS resource set in a second slot, wherein, based on the two SRS resource sets being aperiodic SRS resource sets, the two SRS resource sets are configured with a same trigger value and different slot offset values, wherein a slot-range threshold is based on a subcarrier spacing, and wherein, based on an SRS trigger for the two SRS resource sets exceeding the slot-range threshold, the UE drops a transmission of the second SRS resource set in the second slot.

9. A base station comprising:

one or more transceivers;

one or more processors; and one or more memories operably connected to the one or more processors, the one or more memories storing instructions that are configured so that the one or more processors perform operations based on the one or more memories being executed by the one or more processors, wherein the operations comprise:

transmitting configuration information that includes information for one or more sounding reference signal (SRS) resource sets; and receiving an SRS based on the configuration information, wherein usage of the one or more SRS resource sets is configured as an antenna switching, wherein each of the one or more SRS resource sets is related to a different antenna port, wherein, based on two SRS resource sets being located in two slots, a guard period for the antenna switching exists between a first SRS resource set in a first slot and a second SRS resource set in a second slot, wherein, based on the two SRS resource sets being aperiodic SRS resource sets, the two SRS resource sets are configured with a same trigger value and different slot offset values, wherein a slot-range threshold is based on a subcarrier spacing, and wherein, based on an SRS trigger for the two SRS resource sets exceeding the slot-range threshold, a transmission of the second SRS resource set in the second slot is dropped.

10. The method of claim 1, wherein, a slot-range threshold is based on a subcarrier spacing, and wherein, based on an SRS trigger for the two SRS resource sets exceeding the slot-range threshold, the UE transmits, in the second slot, a reference SRS port and a subset of a plurality of antenna ports.

11. The method of claim 1, wherein, for the two SRS resource sets configured for antenna switching with aperiodic time-domain behaviour:

(i) a same DCI state of a same aperiodicSRS-ResourceTrigger value is configured to trigger both of the two SRS resource sets, (ii) the two SRS resource sets are configured with different slot offset values selected from an available slot offset list, and (iii) across the two slots which are consecutive, a common timing advance (TA), a common uplink spatial transmission filter indicated via TCI-UL-State, and a common SRS power-control state for the two SRS resource sets are applied.

* * * * *